(12) United States Patent
Pandey et al.

(10) Patent No.: US 11,126,670 B2
(45) Date of Patent: Sep. 21, 2021

(54) TOKEN AND DEVICE LOCATION-BASED AUTOMATIC CLIENT DEVICE AUTHENTICATION

(71) Applicant: Verizon Patent and Licensing Inc., Arlington, VA (US)

(72) Inventors: Siddharth Pandey, Irving, TX (US); Manah M. Khalil, Coppell, TX (US); Michael R. Lamison, Dallas, TX (US); John J. Christudass, Coppell, TX (US); Krishna C. Yendrapalli, Irving, TX (US); Narayanan Kasiviswanathan Shankar, Irving, TX (US); Saikumar Dubagunta, Plano, TX (US); Ping Chu, Coppell, TX (US); Maneesha Kalra, Plano, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 149 days.

(21) Appl. No.: 15/591,382

(22) Filed: May 10, 2017

(65) Prior Publication Data
US 2018/0332016 A1  Nov. 15, 2018

(51) Int. Cl.
G06F 16/951 (2019.01)
H04L 29/06 (2006.01)
G06F 21/33 (2013.01)

(52) U.S. Cl.
CPC ...... *G06F 16/951* (2019.01); *G06F 21/335* (2013.01); *H04L 63/0428* (2013.01); *H04L 63/0807* (2013.01); *H04L 63/107* (2013.01); *H04L 63/108* (2013.01); *G06F 2221/2111* (2013.01); *G06F 2221/2137* (2013.01); *G06F 2221/2139* (2013.01)

(58) Field of Classification Search
None
See application file for complete search history.

(56) References Cited

U.S. PATENT DOCUMENTS

| 2013/0247217 A1* | 9/2013 | Junod | G06F 21/6218 726/27 |
| 2014/0310779 A1* | 10/2014 | Lof | G06F 21/6254 726/4 |
| 2015/0242597 A1* | 8/2015 | Danciu | G06F 21/31 726/30 |

(Continued)

OTHER PUBLICATIONS

Bamasag et al., Towards Continuous Authentication in Internet of Things based on Secret Sharing Scheme, 2015 WESS'15, Amsterdam, Netherlands, pp. 1-8 (Year: 2015).*

(Continued)

*Primary Examiner* — Luu T Pham
*Assistant Examiner* — Edward X Long

(57) ABSTRACT

A network device receives credentials of a user of a client device, and receives an enrollment request from the client device, wherein the enrollment request includes a network address of the client device. The network device generates a token comprising the network address and an identifier of the user, encrypts the token, and sends the encrypted token to the client device. The network device receives, when the client device attempts to access a protected resource or a network service, the encrypted token from the client device for authenticating the client device without further requiring the credentials of the user.

16 Claims, 19 Drawing Sheets

(56) References Cited

U.S. PATENT DOCUMENTS

2016/0092869 A1* 3/2016 Salama ................ G06Q 20/367
705/41
2017/0046712 A1* 2/2017 Todasco ................ H04L 63/126

OTHER PUBLICATIONS

Harang et al., Identification of Anomalous Network Security Token Usage via Clustering and Density Estimation, 2012 IEEE, pp. 1-6. (Year: 2012).*

* cited by examiner

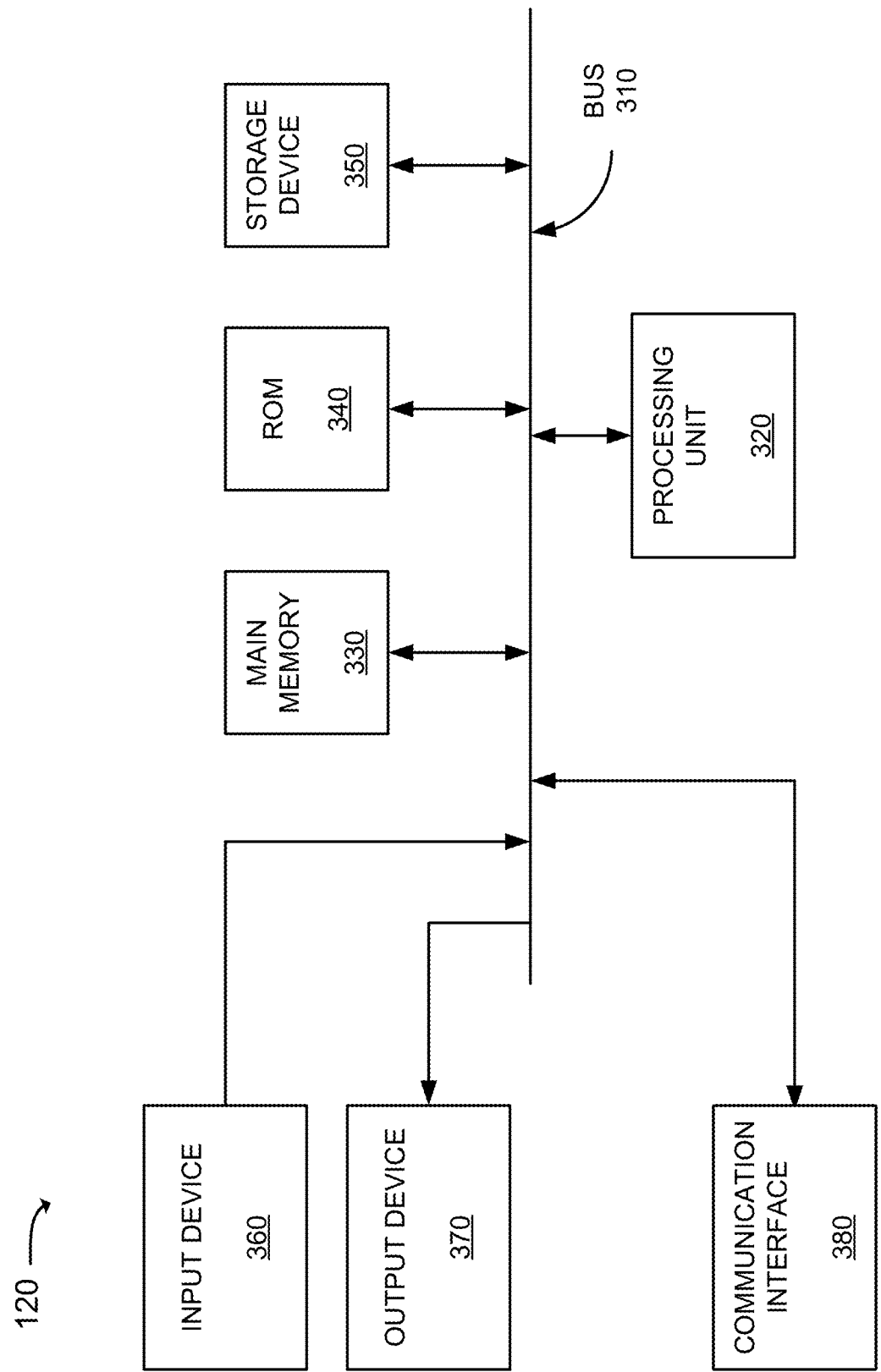

FIG. 7B

TOKEN AND DEVICE LOCATION-BASED AUTOMATIC CLIENT DEVICE AUTHENTICATION

BACKGROUND

Various network services require users to create an account to be granted access to the network services or to a protected resource. Creating an account typically involves the user creating credentials, such as an alphanumeric log-in/password combination, that permit the user access to a given network service. The use of an alphanumeric log-in/password combination for network service, or protected resource, access can be vulnerable to attack for a few different reasons, such as, for example, password re-use, weak passwords, vulnerable password databases, and credentials being exchanged in the clear. Additionally, requiring the use of a log-in/password combination, or other user credentials, each time that a user desires to access network services, or a protected resource, can be a tedious and time consuming exercise for the user.

BRIEF DESCRIPTION OF THE DRAWINGS

FIG. 3 is a diagram that depicts exemplary components of the authentication system of FIGS. 1 and 2A;

FIGS. 7B-7E depict exemplary user interfaces, implemented by a client device, and associated with the exemplary process of FIG. 6;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
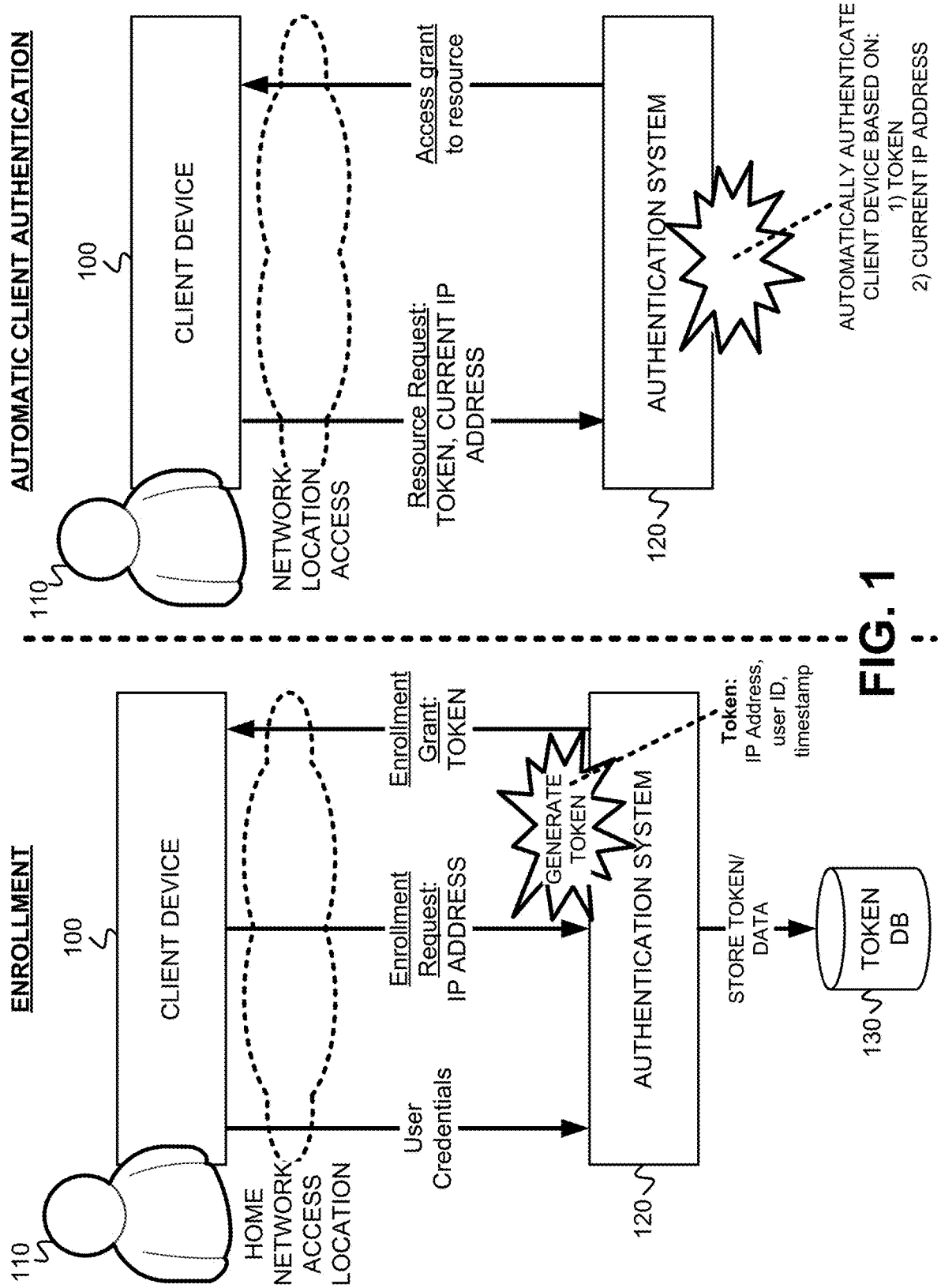
FIG. 1 depicts an overview of token and location-based client device auto-authentication, for protected resource access, according to exemplary embodiments of the invention.

FIG. 1 depicts an overview of token and device location-based automatic client device authentication, for protected resource access, according to exemplary embodiments of the invention. A "protected resource," as referred to herein includes any type of network service access requiring user authentication, or any type of network device access (e.g., for stored files, video, etc.) that requires user authentication. A user 110 of a client device 110 may initially, as shown on the left side of FIG. 1, enroll in the automatic client device authentication service described herein. The enrollment process includes user 110 sending, via client device 100 that user 110 intends to use to access a protected resource(s), user credentials to an authentication system 120. The user credentials may include, for example, a log-in identifier and a password of user 110. User 110 at client device 100 may also initiate an enrollment request, in conjunction with, or subsequent to, providing the user credentials. The enrollment request may be sent, for example, from a home network access location associated with user 110. In one example, the home network access location may include network access at user 110's home. For example, if user 110 subscribes to a network service provider's network access services (e.g., Verizon FiOS) at user 110's residence, then any access by client device 100 at the residence would be considered access via the home network access location. The enrollment request may include a network address (e.g., an Internet Protocol (IP) address) assigned to client device 100 at the time of the home network access.

Upon receipt of the enrollment request, including the network address of client device 100, authentication system 120 retrieves a user ID that is associated with user 110, and obtains a current timestamp. The user ID may have been previously stored in an account database in association with an established account of user 110. Authentication system 120 then generates a token, for user 110 and client device 100, which includes the network address of client device 100, the user identifier (ID) associated with user 110, and the timestamp. The generated token may include other types of data items, in addition to or instead of the client device network address, user ID, and timestamp, such as, for example, a unique token ID, a token version indicator, a token type, and/or padding associated with maintaining a fixed length of the generated token. Additional exemplary details of the generated token are described below, particularly with respect to FIG. 10. Authentication system 120 may encrypt the generated token, using an encryption technique, and may store the generated token in a token database (DB) 130, and may also send an enrollment grant message to client device 100 via the home network access. The enrollment grant message may include the generated token. Client device 100 may subsequently use the received token for automatic authentication when user 110 attempts to access a protected resource(s) from the home network access location.

After the enrollment process, shown in the left-hand portion of FIG. 1, the user 110 of client device 100 may attempt to access a protected resource(s) via a network location access that may, or may not, be the home network access location at which the enrollment process was previously performed. As shown in the right-hand side of FIG. 1, during the attempt to access a protected resource(s) via the network location access, client device 100 may send a resource request to authentication system 120. The resource request may include, for example, the token generated during the enrollment process, and the current network address (e.g., current IP address) assigned to client device 100. Upon receipt of the resource request, authentication system 120 retrieves the token and current network address from the request, decrypts the retrieved token, and then performs an automatic authentication process that does not further require user 110 of client device 100 to provide any type of user credentials. The automatic authentication process may include authentication system 120 authenticating client device 100 based on contents of the retrieved token and based on the current network address associated with the location of client device 100. Details of one exemplary implementation of this auto-authentication process are described below with respect to FIG. 9. If the auto-authentication process is successful, then authentication system 120 sends a grant of access to the protected resource to client device 100.

Figure 2A:
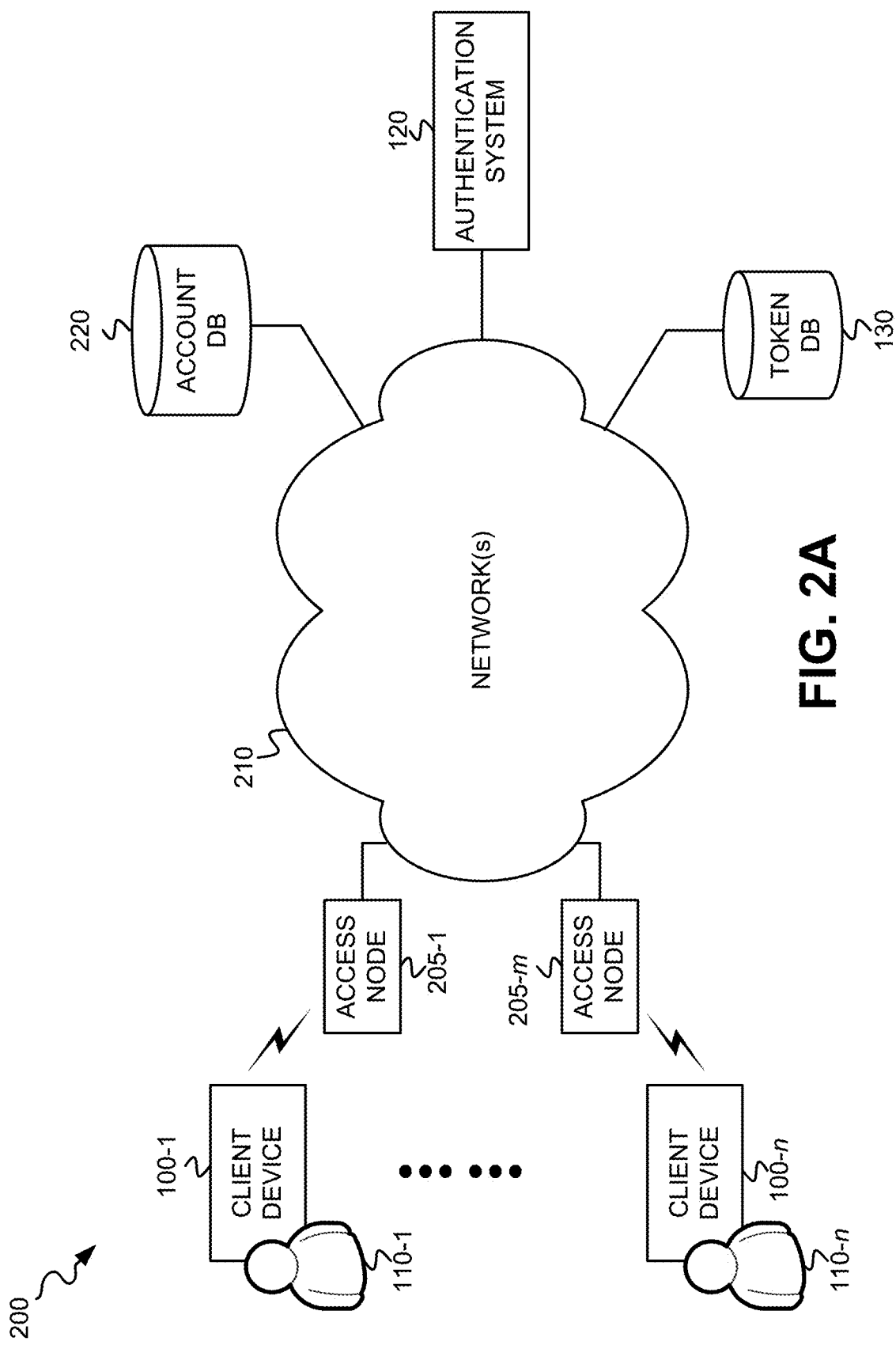
FIG. 2A illustrates an exemplary network environment in which the token and location-based auto-authentication may be implemented.

FIG. 2A illustrates an exemplary network environment 200 in which token and device location-based auto-authentication may be implemented. Network environment 200 includes client devices 100-1 through 100-n, access nodes 205-1 through 205-m, network(s) 210, an account DB 220, authentication system 120, and a token DB 130.

Client devices 100-1 through 100-n (generically referred to herein as "client device 100" or "client devices 100;" n may include any positive integer greater than or equal to one) may each include any type of digital computing device that has a capability to communicate via network(s) 210 to access one or more protected resources. Client devices 100 may each include, for example, a cellular telephone (e.g., smart phone); a wired or wireless laptop, desktop, palmtop or tablet computer; a set-top box (STB); a wearable computer device (e.g., a wrist watch, glasses, etc.); a media playing device; a game playing device; a digital camera device; a vehicle mounted wireless telephone; or a personal digital assistant (PDA). Access nodes 200-1 through 200-m (generically referred to herein as "access node 200" or "access nodes 200;" m may include any positive integer greater than or equal to one) may include any type of access device, or node, that provides a wired or wireless connection to client device 100, and which further connects to network(s) 210. Access nodes 200 may include, for example, a modem, a Wi-Fi access point, a router, a Wi-Fi/router, etc.

Network(s) 210 may include one or more networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network).

Account DB 220 includes one or more network devices that store a data structure that includes account information associated with users 110. Such account information may include, for example, user IDs, user credentials, device network addresses, etc. An exemplary implementation of account DB 220 is described below with respect to FIG. 4.

Authentication system 120 includes one or more network devices that permit a user 110 to enroll a particular client device 100 in the token and location-based auto-authentication service described herein. Authentication system 120 further implements token and location-based auto-authentication when a user 110 attempts to access a protected resource via a client device 100.

Token DB 130 includes one or more network devices that store a data structure that includes information associated with a user 110 that is enrolled in the token and location-based automatic authentication service. Token DB 130 may store, for example, a network address (e.g., IP address) of an enrolled client device 100, a user ID of the user 110, an encrypted token, and a timestamp associated with the token. An exemplary implementation of token DB 130 is described below with respect to FIG. 5.

The configuration of the components of network environment 200 depicted in FIG. 2A is for illustrative purposes only, and other configurations may be implemented. Therefore, network environment 200 may include additional, fewer and/or different components, that may be configured differently, than depicted in FIG. 2A.

Figure 2B:
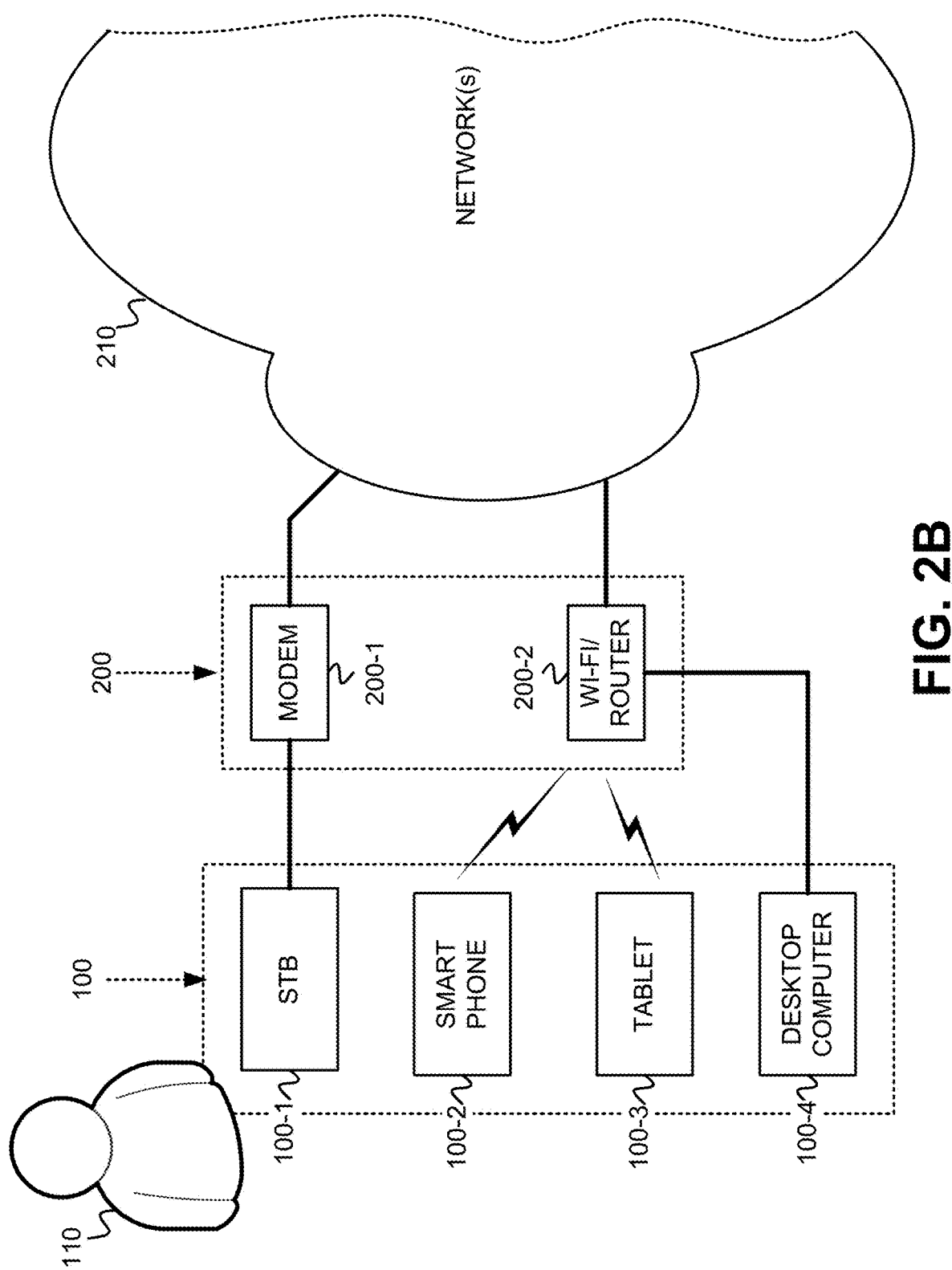
FIG. 2B depicts an example of the network environment of FIG. 2A where a single user uses client devices and access nodes located at a particular location, such as a home residence location.

FIG. 2B depicts an example of the network environment 200 of FIG. 2A where a single user 110 uses client devices 110 and access nodes 200 located at a particular location, such as, for example, a home residence location. In the example of FIG. 2B, the user 110's client devices 100 include a STB 100-1, a smart phone 100-2, a tablet computer 100-3, and a desktop computer 100-4, and the access nodes 200 include a modem 200-1 and a Wi-Fi/router 200-2. As shown in FIG. 2B, STB 100-1 may have a wired connection (e.g., a coaxial connection) to modem 200-1, which further has a wired connection to network(s) 210. As further shown, smart phone 100-2 and tablet 100-3 may each have a wireless connection (e.g., a Wi-Fi or Bluetooth connection) to Wi-Fi/router 200-2, and desktop computer 100-4 may have a wired connection (e.g., a local area network (LAN) connection) to Wi-Fi/router 200-2. In the example of FIG. 2B, user 110 may use STB 100-1 to enroll in the auto-authentication service described herein, and to further send resource access requests, via modem 200-1. Additionally, user 110 may use smart phone 100-2, tablet 100-3, and/or desktop computer 100-4 to enroll in the auto-authentication service described herein, and to further send resource access requests, via Wi-Fi/router 200-2.

FIG. 3 is a diagram that depicts exemplary components of authentication system 120. Client devices 100, access nodes 200, account DB 220, and token DB 130 may each be configured the same as, or similar to, authentication system 120 shown in FIG. 3. Authentication system 120 may include a bus 310, a processing unit 320, a main memory 330, a read only memory (ROM) 340, a storage device 350, an input device 360, an output device 370, and a communication interface 380.

Bus 310 may include a path that permits communication among the components of authentication system 120. Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium."

Input device 360 may include one or more different mechanisms/devices that permit a user/operator to input information to authentication system 120, such as, for example, a keypad or a keyboard, a mouse, a display with a touch sensitive panel, voice recognition and/or biometric mechanisms, etc. Output device 370 may include one or more different mechanisms/devices that output information to the user/operator, including a display, a speaker, etc. Input device 360 and output device 370 may, in some implementations, be implemented as a graphical user interface (GUI) (e.g., a touch screen display) that displays GUI information and which receives user input via the GUI. Communication interface 380 may include one or more transceivers that enable authentication system 120 to communicate with other devices and/or systems. For example, communication interface(s) 380 may include wired and/or wireless transceivers for communicating via network(s) 210.

The configuration of components of authentication system 120 shown in FIG. 3 is for illustrative purposes. Other configurations may be implemented. Therefore, authentication system 120 may include additional, fewer and/or different components, arranged in a different configuration, than depicted in FIG. 3.

Figure 4:
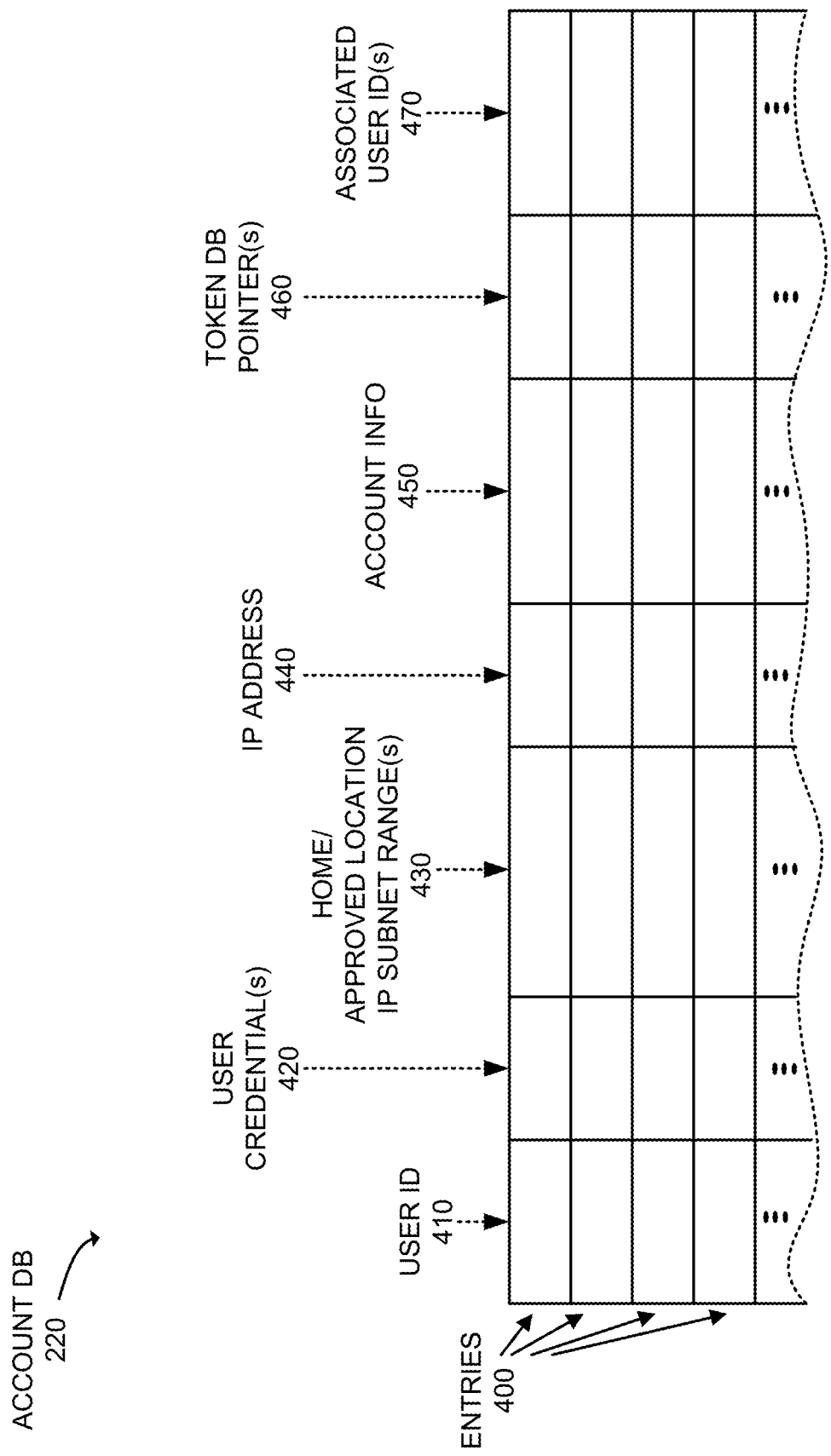
FIG. 4 depicts an exemplary implementation of the account database of FIG. 2A.

FIG. 4 depicts an exemplary implementation of account DB 220. As shown, a data structure of account DB 220 may include multiple entries 400, with each entry 400 including multiple fields, such as a user identifier (ID) field 410, a user credential(s) field 420, a home/approval location IP subnet range(s) field 430, an IP address field 440, an account information field 450, a token DB pointer field 460, and an associated user ID(s) field 470.

User identifier (ID) field 410 stores data that includes a unique identifier (e.g., numeric, alphanumeric, etc.) that identifies a particular user 110 that owns and/or operates the client device 100 assigned the network address identified in field 440. User credential(s) field 420 stores the credentials (e.g., username and password) of the user identified in field 410 that the user must use to access the user's account, and to enroll a client device 100 in the auto-authentication service described herein.

Home/approval location IP subnet range(s) field 430 stores data that identifies a subnet range associated with a user 110's home network access location, and/or with the user 110's approved network access location(s), at which the user 110 may be auto-authenticated for protected resource access. Other than a home network access location, the user 110 may additionally approve other specific network access locations (e.g., a work location) for auto-authentication. IP address field 440 stores data that identifies a network address (e.g., an IP address) assigned to a particular client device 100 of the user 110 that is enrolled in the auto-authentication service.

Account information field 450 stores data associated with the user 110's account. The data may include, for example, a residence address of user 110, a telephone number of user 110, etc. Token DB pointer field 460 stores a pointer to an entry 500 of token DB 130 that stores an encrypted token associated with a client device 100 having the network address identified in field 440 of account DB 220. The pointer stored in field 460 may be used to retrieve data from the entry 500 in token DB 130 to which the pointer points.

Associated user ID(s) field 470 stores one or more user IDs of other users 110 associated with the user 110 identified in user ID field 410, or associated with the home/approved location IP subnet range(s) identified in field 430. The user 110 identified in user ID field 410 may, when establishing an account (or at the time user 110 enrolls in auto-authentication, as described below with respect to FIGS. 6A and 6B), identify one or more other users to be associated with the account who may also engage in auto-authentication via the client device 100 having the IP address identified in field 440.

To locate a particular entry 400 of account DB 220, DB 220 may be indexed with, for example, a user ID to locate an entry 400 having a matching user ID stored in field 410. When such an entry 400 is located, data may be stored in one or more fields 410, 420, 430, 440, 450, 460, or 470 of the entry 400, or retrieved from one or more fields 410, 420, 430, 440, 450, 460, or 470 of the entry 400. Other fields of an entry 400, instead of user ID field 410, may additionally, or alternatively, be used for indexing account DB 220 to locate a particular entry 400 of account DB 220.

Figure 5:
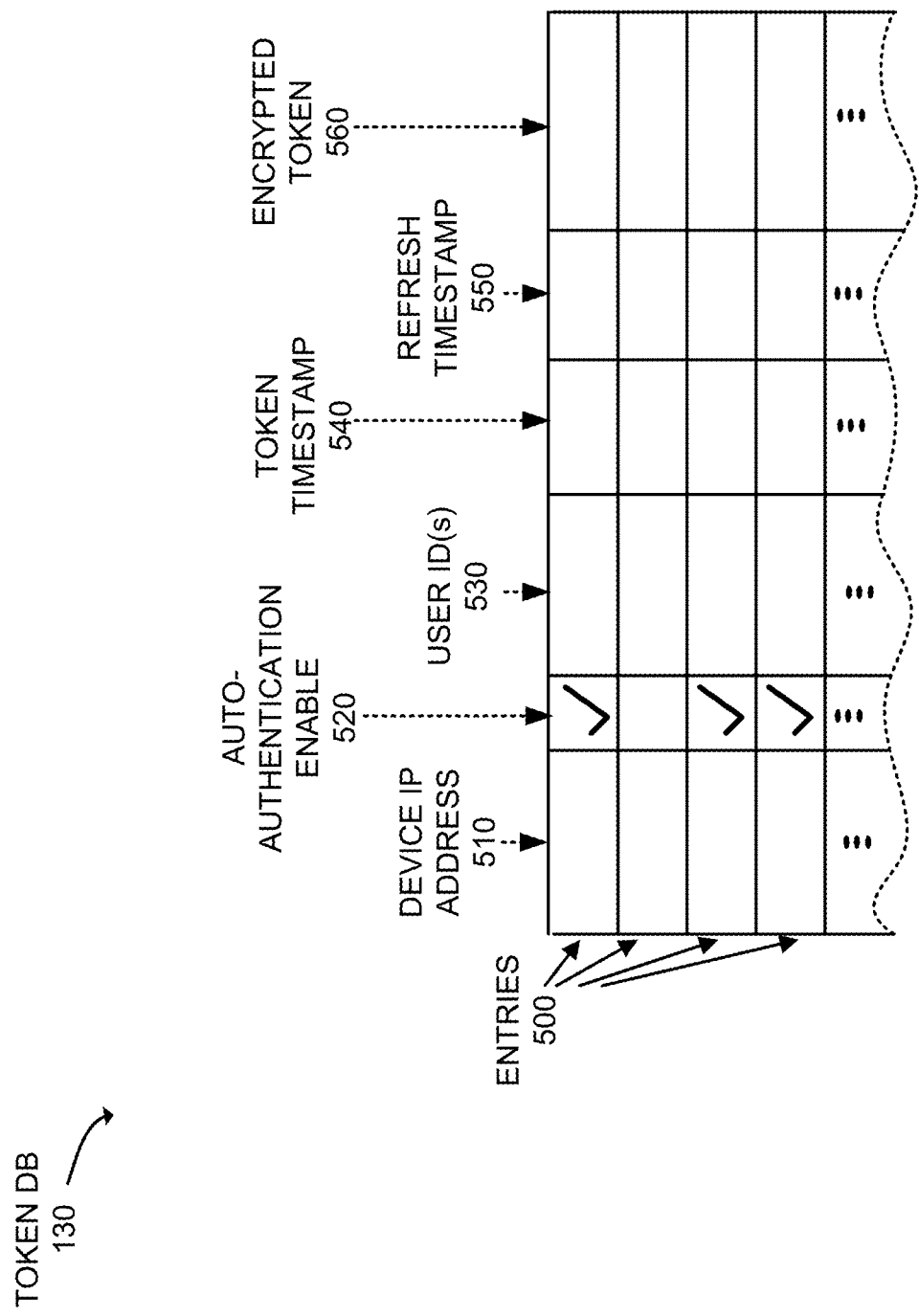
FIG. 5 depicts an exemplary implementation of the token database of FIG. 2A.

FIG. 5 depicts an exemplary implementation of token DB 130. As shown, a data structure of token DB 130 may include multiple entries 500, with each entry 500 including multiple fields, such as a device IP address field 510, an auto-authentication enable flag field 520, a user ID field 530, a token timestamp field 540, a refresh timestamp field 550, and an encrypted token field 560.

Device IP address field 510 stores data that identifies a network address (e.g., an IP address) assigned to a particular client device 100 that is enrolled in the auto-authentication service. Auto-authentication enable flag field 520 stores a flag that indicates whether the client device 100 identified by the network address in field 510 is currently enrolled in, or disenrolled from, the auto-authentication service. User ID(s) field 530 stores data that includes a unique identifier (e.g., numeric, alphanumeric, etc.) that identifies a particular user 110 that owns and/or operates the client device 100 assigned the network address identified in field 510. Field 530 may additionally store unique identifiers of other users that have been identified as being authorized for auto-authentication via the client device 100 having the IP address identified in field 510. In some implementations, the unique identifiers of these other users may be provided by user 110 at, for example, the time that user 110 enrolls in auto-authentication (e.g., as described below with respect to the process of FIGS. 6A and 6B).

Token timestamp field 540 stores a timestamp associated with the token stored in token field 560. The timestamp identifies a time (e.g., hour, minute, day, year) at which the token was generated by authentication system 120 and assigned to the client device 100 having the network address indicated in field 510. The timestamp may be used by authentication system 120 to determine an "age" of the token, and to, for example, determine whether to require the user 110 of the client device 100 to manually re-authenticate such as, for example, via explicit provision of user credentials by user 110. Refresh timestamp field 550 stores a second timestamp associated with the token stored in token field 560. The timestamp identifies a time (e.g., hour, minute, day, year) at which the generated token is to expire, and required to be refreshed by, for example, having the user 110 of the client device 100 manually re-authenticate. Encrypted token field 560 stores the encrypted token generated by authentication system 120 for the client device 100 assigned the network address identified in field 510.

To locate a particular entry 500 of token DB 130, DB 130 may be indexed with, for example, a device IP address 510 to locate an entry 500 having a matching IP address stored in field 510. When such an entry 500 is located, data may be stored in one or more fields 510, 520, 530, 540, 550, or 560 of the entry 500, or retrieved from one or more fields 510, 520, 530, 540, 550, or 560. Other fields of an entry 500, instead of device IP address field 510 (e.g., user ID field 530), may additionally, or alternatively, be used for indexing token DB 130 to locate an entry 500 of token DB 130.

Account DB 220 and token DB 130 are depicted in FIGS. 4 and 5 as including tabular data structures with certain numbers of fields having certain content. The tabular data structures of DBs 220 and 130 shown in FIGS. 4 and 5, however, are for illustrative purposes. Other types of data structures may alternatively be used. The number, types, and content of the entries and/or fields in the data structures of DBs 220 and 130 illustrated in FIGS. 4 and 5 are also for illustrative purposes. Other data structures having different numbers of, types of and/or content of, the entries and/or the fields may be implemented. Therefore, DBs 220 and 130 may include additional, fewer and/or different entries and/or fields than those depicted in FIGS. 4 and 5.

Figure 6A:
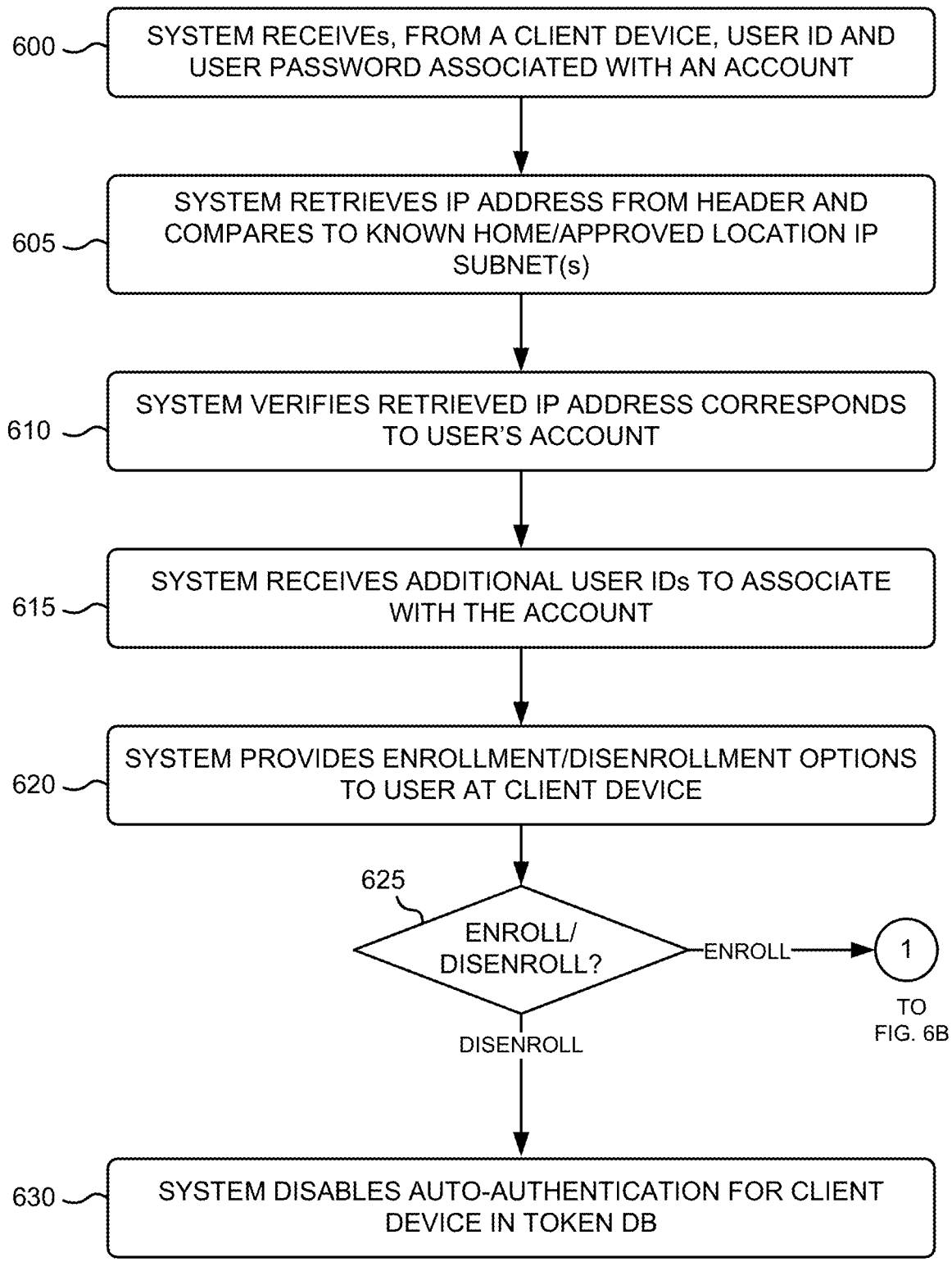
FIGS. 6A and 6B are flow diagrams that illustrate an exemplary process for a user to enroll a particular client device in the token and location-based auto-authentication service described herein.
Figure 6B:
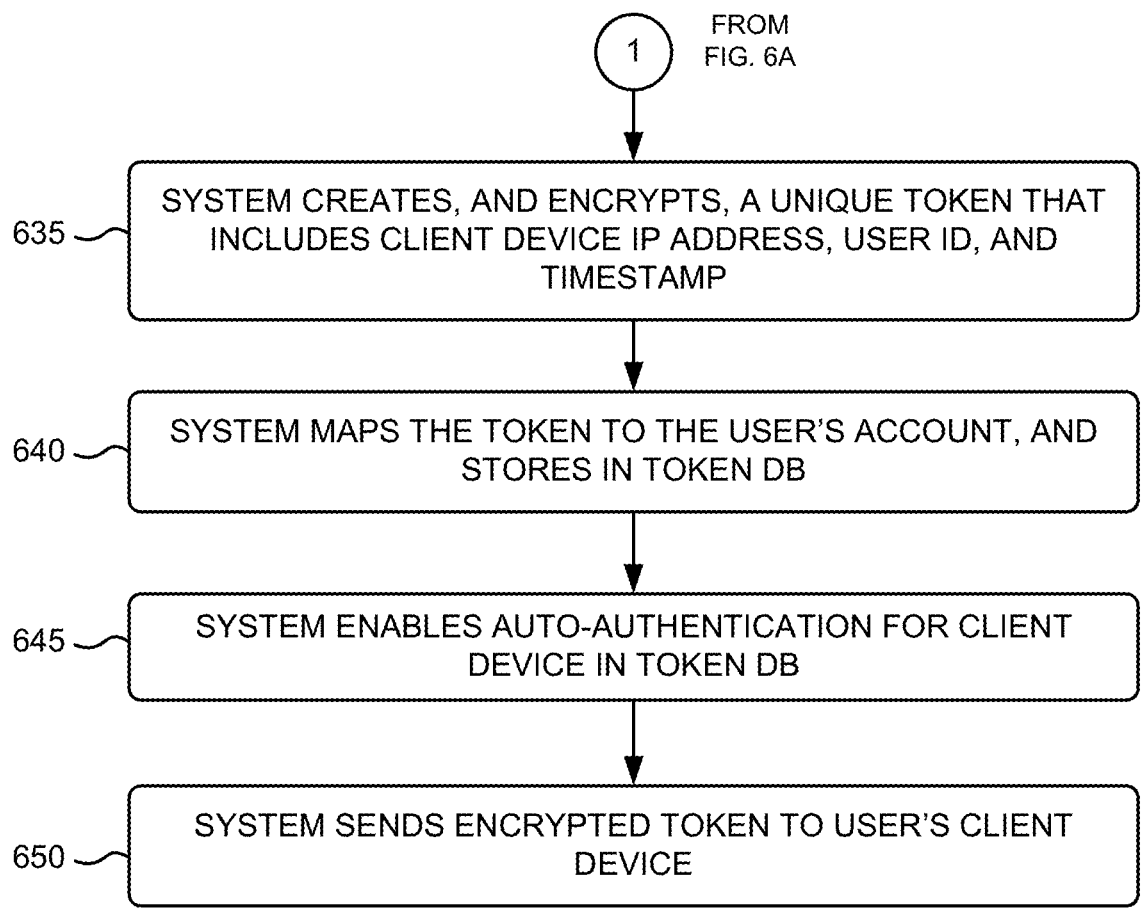

FIGS. 6A and 6B are flow diagrams that illustrate an exemplary process for a user 110 to enroll a particular client device 100 in the token and location-based auto-authentication service. The exemplary process of FIGS. 6A and 6B may be implemented by authentication system 120 (e.g., processing unit 320 of authentication system 120). The exemplary process of FIGS. 6A and 6B is described below with reference to the diagrams of FIGS. 7A-7E and 8.

The exemplary process may include authentication system 120 receiving, from a client device 100, a user ID and a user password (block 600). The user ID and user password may be chosen by user 110 for access to a general network service provider account (e.g., the user's My Verizon account), or may be chosen by user 110 specifically for the token and location-based auto-authentication service. As one example, the user ID may include user 110's email address, and the user password may include a sequence of alphanumeric characters. Client device 100, upon receipt of the user ID and the user password from the user 110 (e.g., via input device 360 of client device 100), sends a data unit (e.g., a packet) containing the user credentials to authentication system 120. The data unit, in the data unit header, additionally includes a network address (e.g., IP address) currently assigned to client device 100. Referring to the messaging diagram of FIG. 8, client device 100 is depicted sending user credentials 805 (e.g., a user name and password) to authentication system 120.

Figure 8:
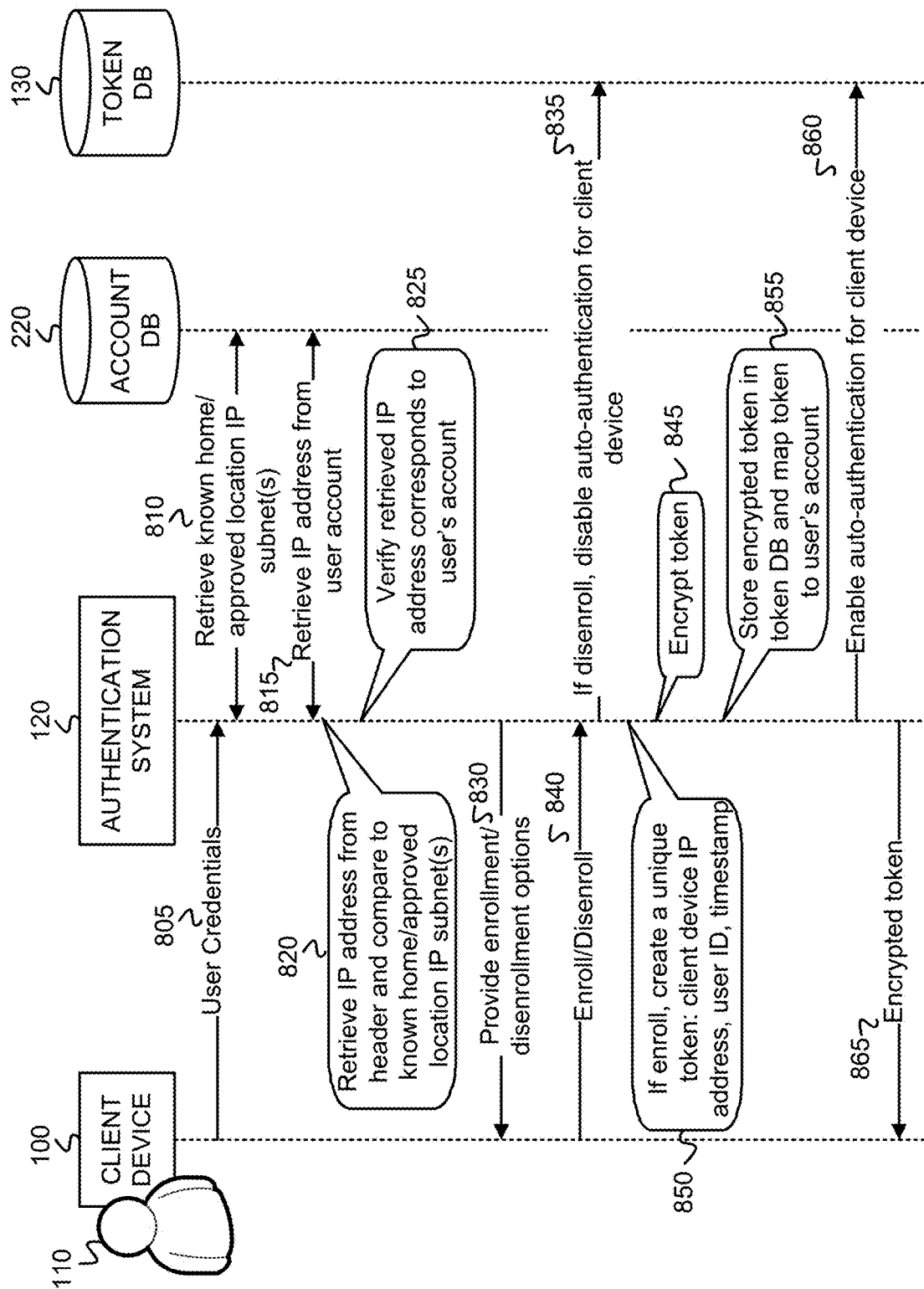
FIG. 8 is an exemplary messaging and activity diagram associated with the process of FIG. 6.

Authentication system 120 retrieves an IP address from the header of the data unit associated with the user credentials, and compares the IP address to a known home, or approved location, IP subnet(s) (block 605). A particular IP subnet range may be associated with a known home network access location, or an approved network access location, of user 110. For example, the network service provider (e.g., Verizon) may allocate a particular IP subnet range to the user's 110 network access, via one or more client devices 110, from user 110's home residence. Additionally, or alternatively, the user 110 may designate a location, which is different from the home residence, as an "approved location" for network access. The network service provider may allocate a particular IP subnet range to the user 110's network access, via one or more client devices 110, from this approved location. An example of an approved location may, for example, include the user 110's network access at a work location (e.g., via Wi-Fi at an employer's physical address). The home residence IP subnet range and/or approved location IP subnet range may be retrieved, for the user 110, from field 430 of account DB 220 after user 110 successfully supplies their credentials. Authentication system 120 uses the user ID of the user 110 to retrieve one or more IP subnet ranges stored in field 430 of account DB 220. Authentication system 120 then compares the IP address of client device 100, retrieved from the header of the data unit, to determine if the IP address falls within any of the one or more IP subnet ranges retrieved from field 430. If the comparison indicates that the IP address does not fall within any of the one or more IP subnet ranges, then the exemplary process of FIGS. 6A and 6B ends without permitting the user 110 to enroll in, or disenroll from, the auto-authentication service. If the comparison indicates that the IP address does fall within any of the one or more IP subnet ranges, then the exemplary process continues at block 610. FIG. 8 depicts authentication system 120 retrieving 810 a known home location and/or approved location IP subnet range(s)) from account DB 220 (e.g., from field 430 of an entry 400 of DB 220), and retrieving 815 an IP address assigned to client device 100 from account DB 220 (e.g., from field 440 of an entry of DB 220). As further shown in FIG. 8, authentication system 120 retrieves 820 the IP address for client device 100 from the header of the message containing the user credentials, and compares the header IP address to the known home network access location IP subnet range(s), and/or an approved network access location IP subnet range(s), retrieved from account DB 220.

Authentication system 120 verifies the retrieved IP address as corresponding to the user's account (block 610). Authentication system 120 uses the user ID supplied by user 110 to locate every entry 400 in account DB 220 having a matching user ID stored in user ID field 410. For every located entry 400, authentication system 120 retrieves a network address (e.g., IP address) from IP address field 440, and compares the retrieved network address with the IP address retrieved from the data unit header. If a match between the network address(es) retrieved from account DB 220, and the network address retrieved from the data unit header is not found, then the exemplary process of FIGS. 6A and 6B ends without permitting the user 110 to enroll in, or disenroll from, the auto-authentication service. If a match between the network address(es) retrieved from account DB 220, and the network address retrieved from the data unit header is found, then the exemplary process continues at block 615. FIG. 8 depicts authentication system 120 verifying 825 that the IP address retrieved from the message containing the user credentials corresponds to user 110's user account.

Figure 7A:
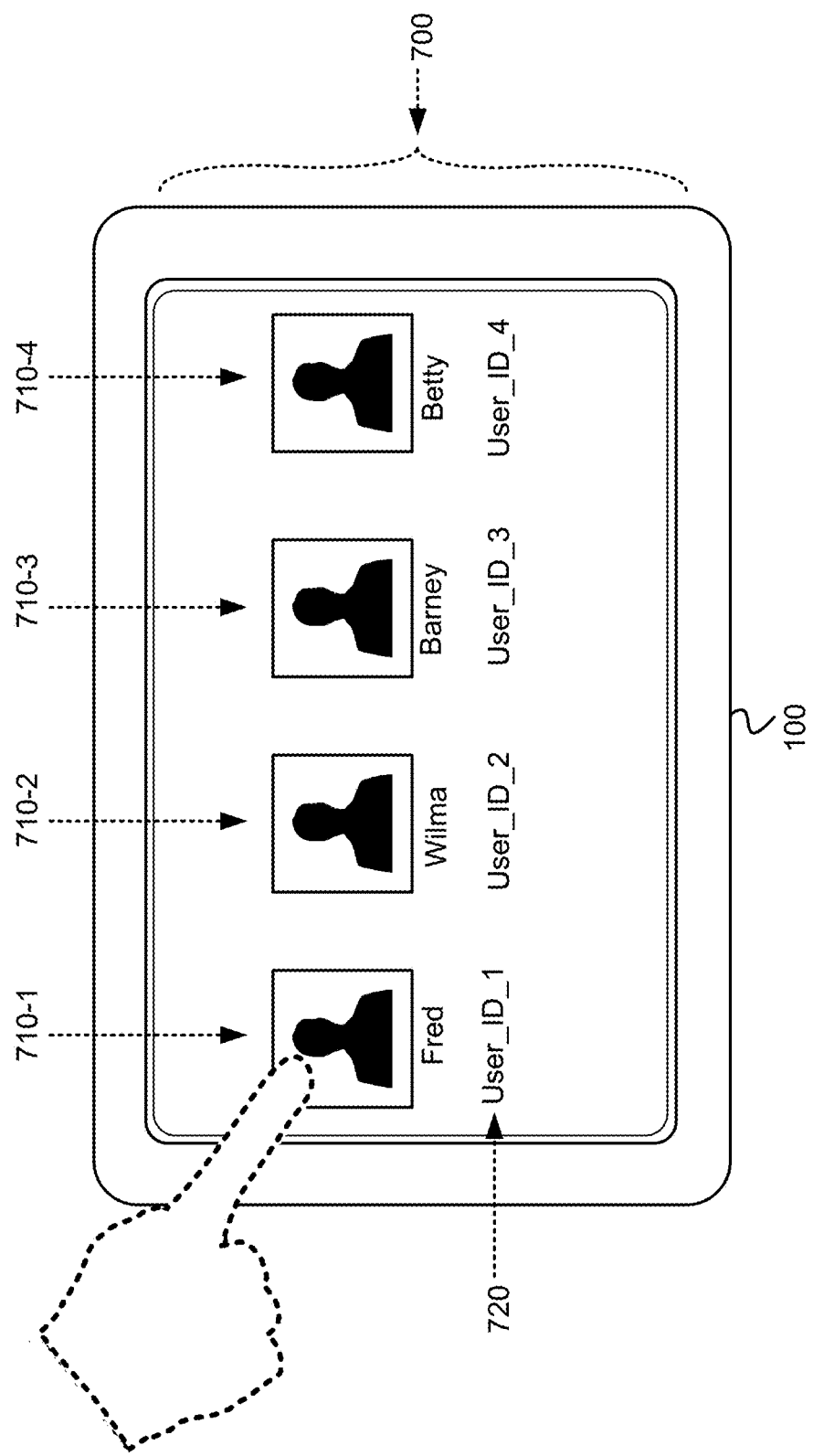
FIG. 7A depicts an exemplary user interface, implemented by a client device, that permits selection of one or more additional users that may engage in auto-authentication using a same client device.

Authentication system 120 receives additional user IDs to be associated with the user account (block 615). Block 615 may be optionally executed (e.g., skipped in some implementations), and serves to enable the user 110 to supply the user IDs of one or more other users that are authorized to use the auto-authentication service via the current client device 100. FIG. 7A depicts an example of a user interface implemented at client device 100 that permits the user 110 to select from one or more users from a list of multiple other users. As shown, icons 710-1 through 710-4 (four icons shown by way of example) associated with a list of other users may be presented via the user interface 700, with each icon 710 being further associated with a unique user ID 720 of a particular user. The user 110 may, via the user interface 700, select one or more of the icons 710-1 through 710-4, and the corresponding user IDs 720 can be stored in field 470 of the appropriate entry 400 of DB 220 such that the users identified by the user IDs are authorized for auto-authentication when using the client device 100.

Figure 7B:
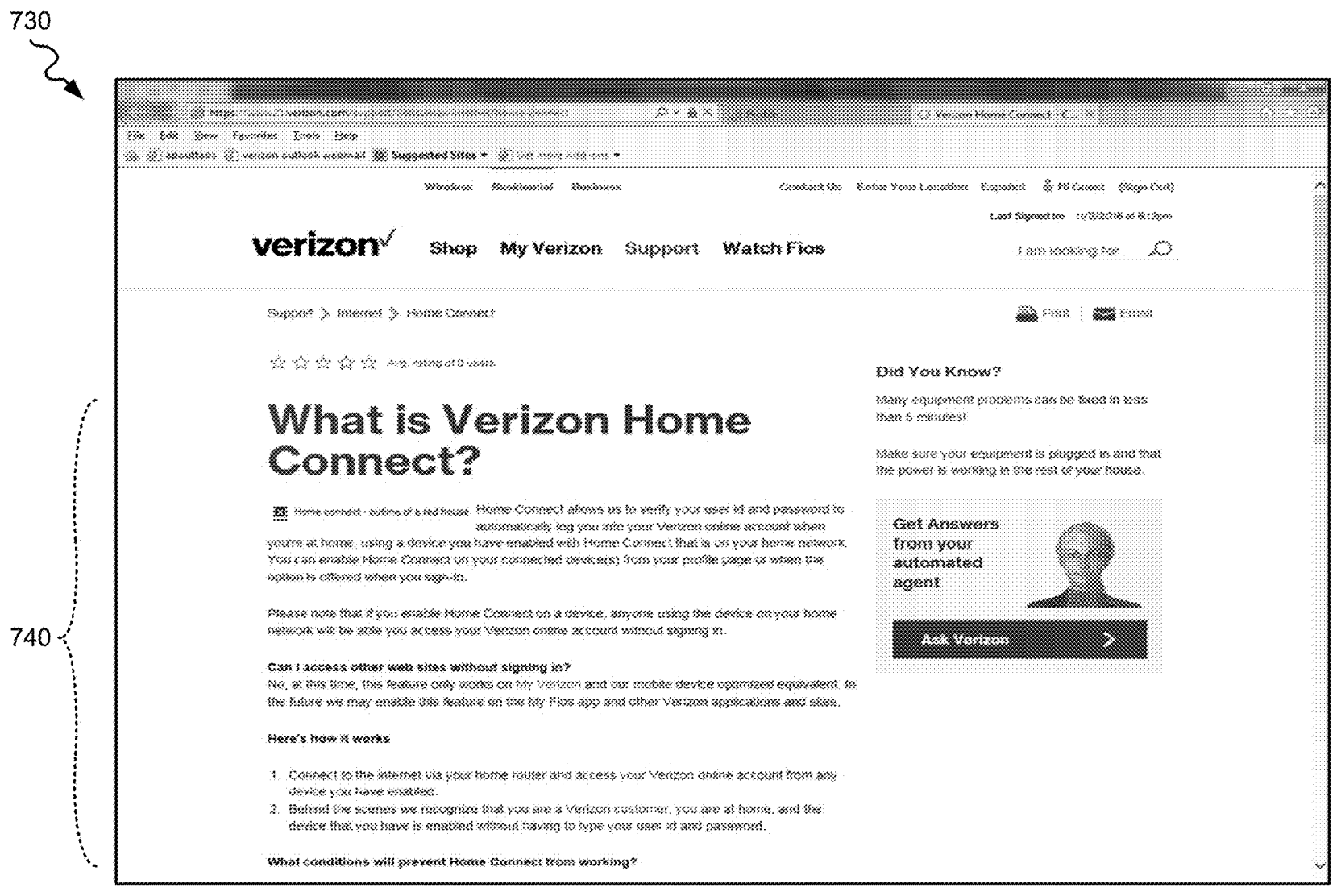
Figure 7C:
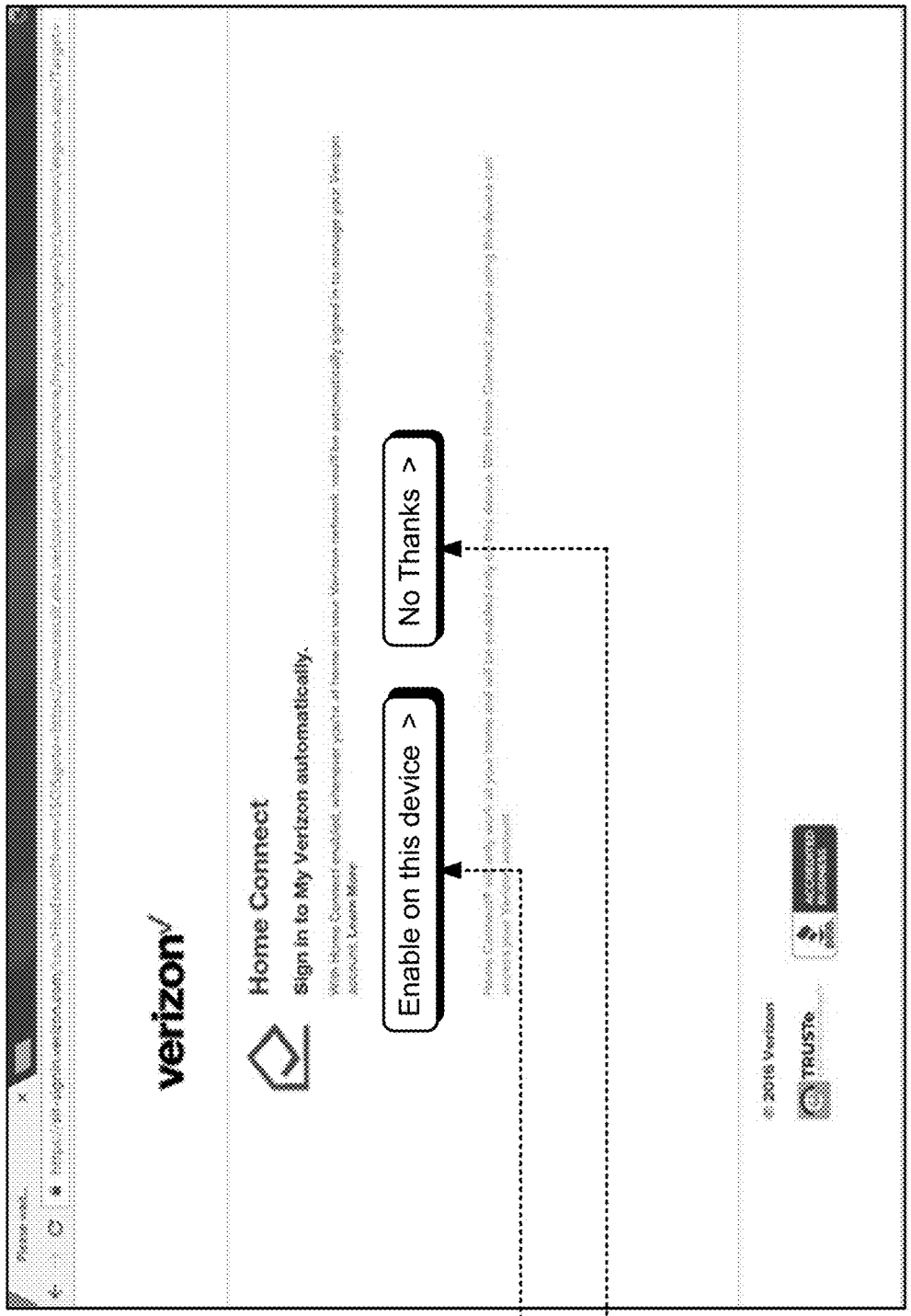

Authentication system 120 provides enrollment/disenrollment options to the user at client device 100 (block 620). Provision of enrollment/disenrollment options to user 110 at client device 100 may include, for example, providing, as shown in FIG. 7B, a description 740 of the auto-authentication service as shown in the exemplary user interface 730. The description 740, provided to client device 100 via user interface 730, informs the user 110 of the nature of the auto-authentication service such that the user 110 can decide to enroll or not enroll in the service. Subsequent to providing the description 740, authentication system 120 may further provide, as depicted in FIG. 7C, enrollment/disenrollment options 7450 via user interface 730 at client device 100. The options 745 may include a first selectable button 750, "enable on this device," that enables auto-authentication on the client device 100 currently being used, or a second selectable button 755, "No thanks," that disables auto-authentication of the client device 100 currently being used. FIG. 8 depicts authentication system 120 providing 830 enrollment/disenrollment options to user 110 at client device 100.

Figure 7D:
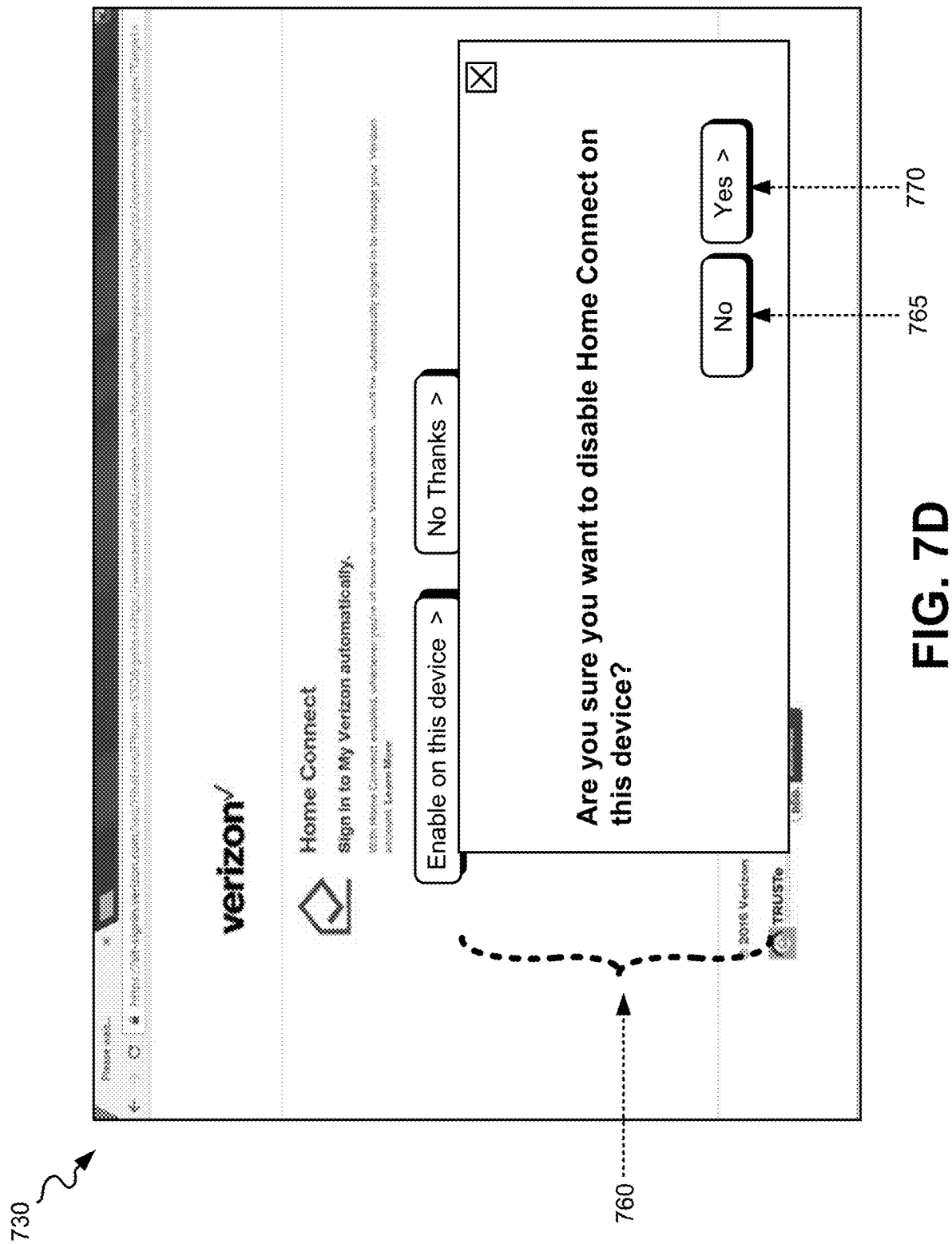
Figure 7E:
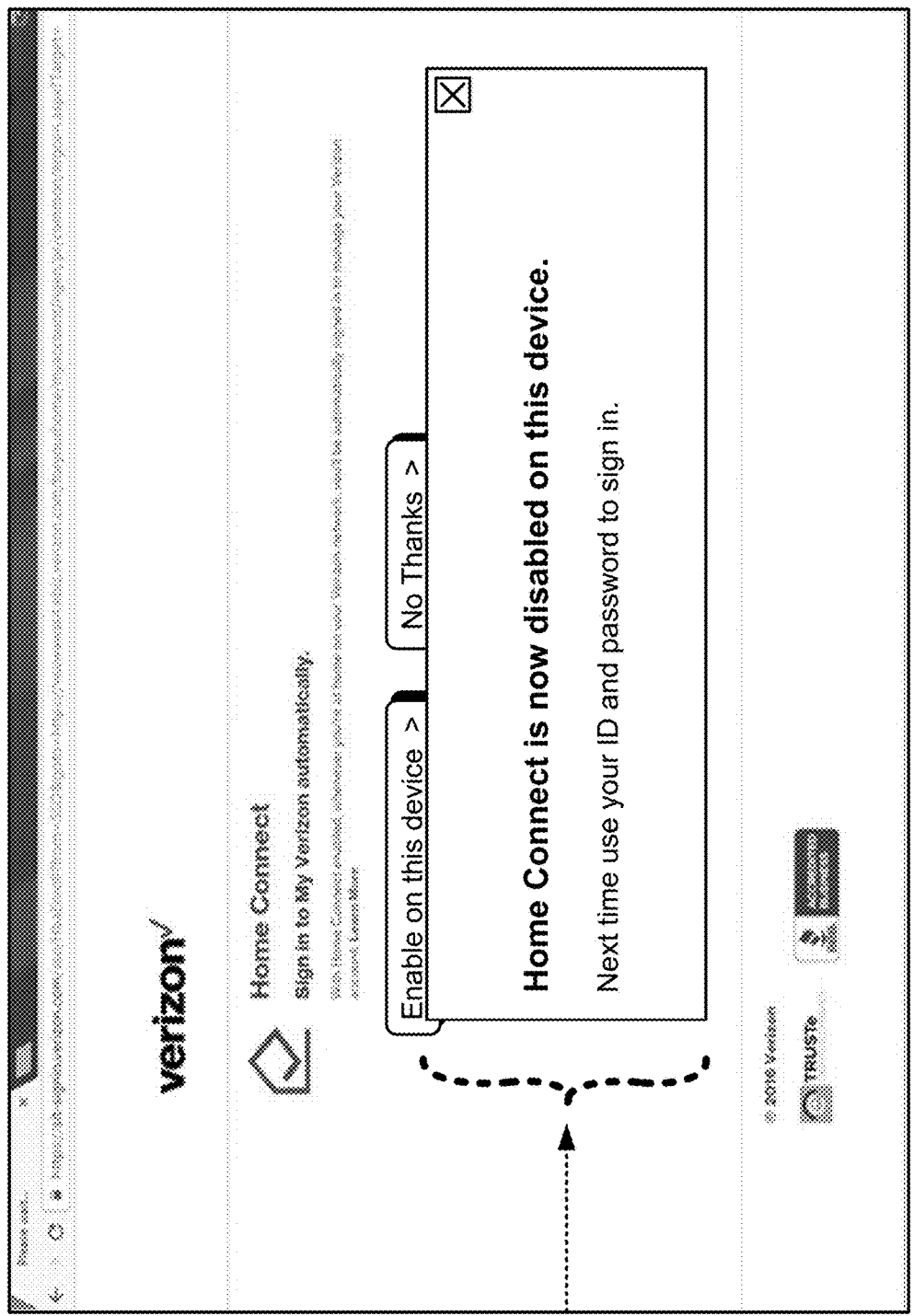

Authentication system 120 determines if the user has enrolled or disenrolled (block 625). Referring to user interface 700 depicted in FIG. 7C, if the user 110 selects the "enable on this device" button 750, then authentication system 120 enrolls the user 110's current client device 100 in the auto-authentication service. If, however, the user 110 instead selects the "No thanks" button 755, then authentication system 120 disenrolls the user 110's current client device 100 from the auto-authentication service. If disenrolled ("disenroll"—block 625), then authentication system 120 disables auto-authentication for client device 100 in token DB 130 (block 630). Disabling auto-authentication for the client device 100 includes indexing token DB 130 with the user 110's user ID and the network address of the client device 100 to identify an entry 500 having matching contents in field 530 and field 510. Upon locating an entry 500 in token DB 130, authentication system 120 clears (i.e., sets to zero) a flag in the auto-authentication enable field 520 of the entry 500. Prior to disenrolling the client device 100 from the auto-authentication service, and subsequent to the user 110 selecting the "No thanks" button 755, user interface 730 at client device 100 may present, as shown in FIG. 7D, a verification window 760 that enables the user 110 to verify that user 110 wants to disenroll client device 100 from the auto-authentication service. As depicted in FIG. 7D, window 760 of user interface 730 presents a "no" option 765 that, if selected, stops disenrollment of client device 100 from the auto-authentication service, and a "yes" option 770 that, if selected, results in auto-authentication being disabled from the client device 100. If the "yes" option 765 is selected, user interface 730 presents, as further shown in FIG. 7E, a window 775 with a message verifying that auto-authentication has been disabled for client device 100. FIG. 8 depicts client device 100, based on input of user 110, sending an indication of auto-authentication enrollment/disenrollment 840 to authentication system 120. If the user 110 has selected disenrollment, authentication system 120, as shown in FIG. 8, disables 835 auto-authentication for client device 100 in token DB 130.

If enrolled ("enrolled"—block 625), then authentication system 120 creates, and encrypts, a unique token that includes, for example, the client device IP address, the user ID, and a timestamp (block 635). The timestamp may include, for example, a day, year, hour, minute and second associated with a current time at which the token is created. In addition to the timestamp, authentication system 120 may obtain a "refresh" timestamp that indicates a time at which the created token expires. Creation of the token involves appending the client device 100's IP address to the user ID, and to the timestamp. Alternatively, creation of the token may involve appending the client device 100's IP address to the user ID, the timestamp, and the refresh timestamp. Other types of data items, in addition to, or instead of, the client device IP address, the user ID, and the timestamp, may be included within the unique token, as described further below. One exemplary implementation of block 635 is described in further detail below with respect to FIGS. 9 and 10. After appending the IP address, the user ID, and the timestamp to one another, authentication system 120 applies an encryption algorithm to the block of appended data to create an encrypted token. Various types of known encryption algorithms may be used. The encrypted token is stored in a token field 560 of an entry 500 indexed by the IP address of the client device 100 and the user 110's user ID. Authentication system 120 maps the token to the user's account and stores the token in token DB 130 (block 640). Mapping the token to the user's account includes authentication system 120 identifying a pointer (i.e., in memory) to the entry 500 that stores the encrypted token in field 560, and storing the pointer in token DB pointer field 460 of an entry 400 of account DB 220 that corresponds to the user 110's user ID (e.g., the user ID matches a content of field 410). FIG. 8 depicts authentication system 120, subsequent to receiving an indication of enrollment from user 110 at client device 100, creating 850 a unique token that includes the client device 100's IP address appended to the user ID of user 110, and a timestamp generated by authentication system 120. As further shown in FIG. 8, authentication system 120 encrypts 845 the created token, stores 855 the token in token DB 130, and maps the token to user 110's account.

Authentication system 120 enables auto-authentication for client device 100 in token DB 130 (block 645). Enabling auto-authentication for the client device 100 includes indexing token DB 130 with the user 110's user ID and the network address of the client device 100 to identify an entry 500 having matching contents in field 530 and field 510. Upon locating an entry 500 in token DB 130, authentication system 120 sets (i.e., sets to one) a flag in the auto-authentication enable field 520 of the entry to enable auto-authentication for client device 100. FIG. 8 depicts authentication system 120 enabling 860 auto-authentication for client device 100 in token DB 130. Authentication system 120 sends the encrypted token to the user's client device 100 (block 650). As shown in the messaging diagram of FIG. 8, authentication system 120 returns an encrypted token 865 to client device 100 in an enrollment grant message. Upon receipt of the encrypted token, client device 100 stores the token in local memory. Client device 100 may subsequently use, as described with respect to the process of FIG. 11 below, the encrypted token for auto-authentication when user 110 requests access to a protected resource via client device 100.

The blocks of FIGS. 6A and 6B may be selectively repeated each time a user 110 of a client device 100 desires to enroll the client device 100 in, or disenroll the client device 100 from, the auto-authentication service described herein.

Figure 9:
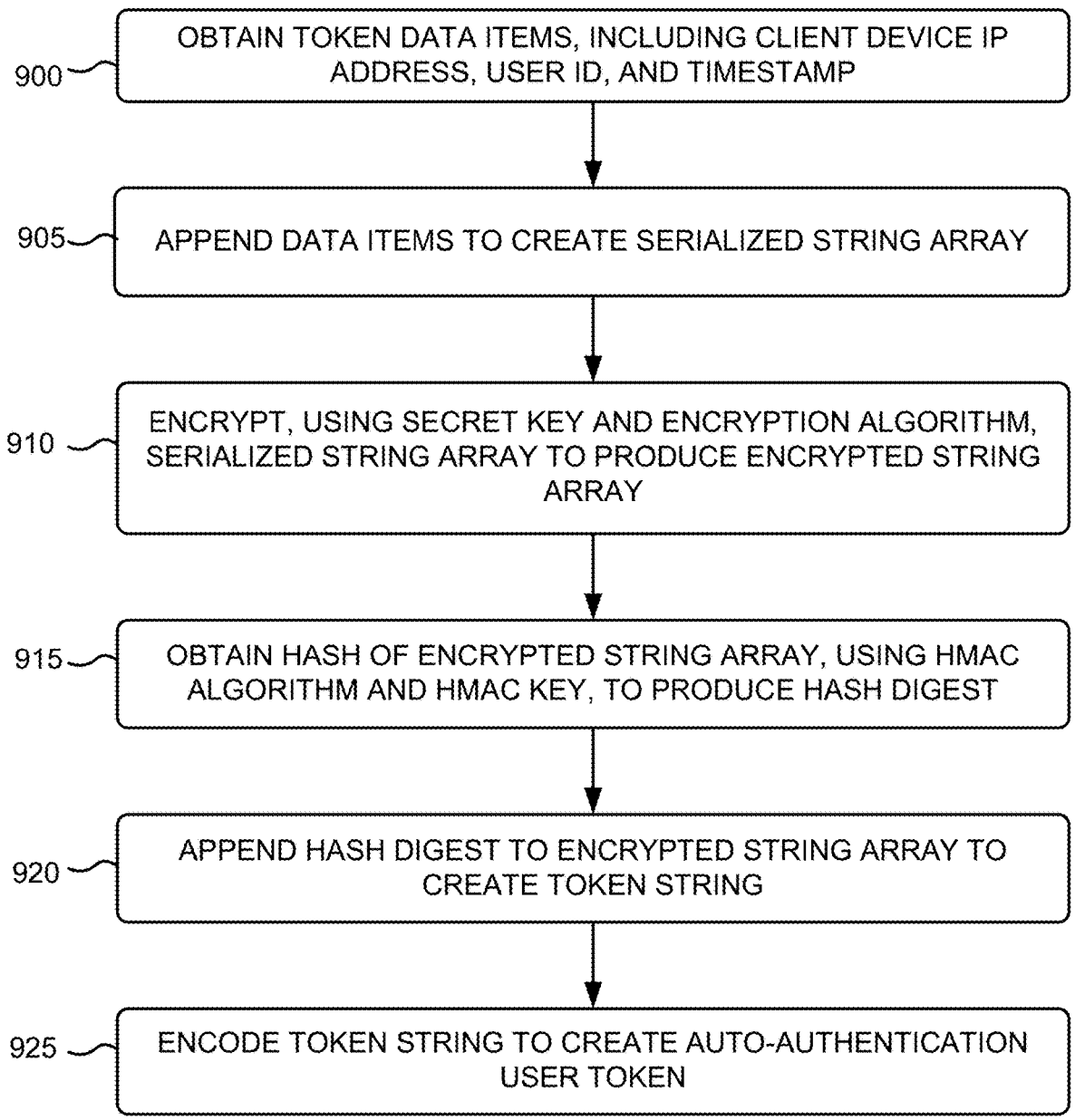
FIG. 9 is a flow diagram that describes an exemplary implementation of block 635 of the process of FIGS. 6A and 6B.

FIG. 9 is a flow diagram that describes one exemplary implementation of block 635 of the process of FIGS. 6A and 6B. The exemplary process of FIG. 9 may be implemented by authentication system 120 (e.g., processing unit 320 of authentication system 120). The exemplary process of FIG. 9 is described below with reference to the exemplary token content and structure diagram of FIG. 10. The exemplary process of FIG. 9 may be repeated each time block 635 is executed within the overall process of FIGS. 6A and 6B.

Execution of block 635 of FIG. 6B may include authentication system 120 obtaining token data items, including, for example, the client device IP address, the user ID, and the timestamp (block 900). Various different token data items, in addition to and/or instead of the client device IP address, the user ID and/or the timestamp, may be obtained by authentication system 120 for placement in a token 1000. For example, referring to FIG. 10, a token version 1030-1, a token ID 1030-2, a token type 1030-3, an app ID 1030-5, and a refresh timestamp 1030-8 may be obtained, in addition to a user ID 1030-4, a device IP address 1030-6, and a timestamp 1030-7. The token version 1030-1 includes data that indicates a particular version of a token (e.g., version 1.0, 2.0). Identification of the particular version of the token may be necessary if the content and/or structure of the token is changed between versions. The token ID 1030-2 includes data that uniquely identifies the particular token 1000 relative to any other token. The token type 1030-3 includes data that identifies a particular type, of multiple different types, of tokens of the token 1000 being generated. Different tokens may be used for different purposes and the token type 1030-3 provides an indication of the type of function and/or purpose of the token 1000. The app ID 1030-5 may identify a particular application that is to be used to access a protected resource. The app ID 1030-5 enables the auto-authentication to be application specific when authentication system 120 authenticates the contents of the token 1000. The refresh timestamp 1030-8 includes timestamp data that identifies a time (e.g., hour, minute, day, year) at which the token 1000 is to expire, and is required to be refreshed by, for example, having the user 110 of the client device 100 manually re-authenticate.

Authentication system 120 may append the data items to create a serialized string array (block 905). For example, referring to FIG. 10, the token data items, such as, for example, the token version 1030-1, the token ID 1030-2, the token type 1030-3, the user ID 1030-4, the app ID 1030-5, the device IP address 1030-6, the timestamp 1030-7, and the refresh timestamp 1030-8 may be appended to one another to create a serialized token string 1020. Authentication system 120 may encrypt, using a secret key and an encryption algorithm, the serialized string array to produce an encrypted string array (block 910). If the encryption algorithm is a symmetric encryption algorithm, the secret key may be a key that is used for both encryption and decryption. The encryption algorithm may include any type of existing encryption algorithm that may produce ciphertext from the plaintext of the serialized token string 1020. In one implementation, for example, the encryption algorithm may include 256-bit Advanced Encryption Standard (AES) encryption.

Figure 10:
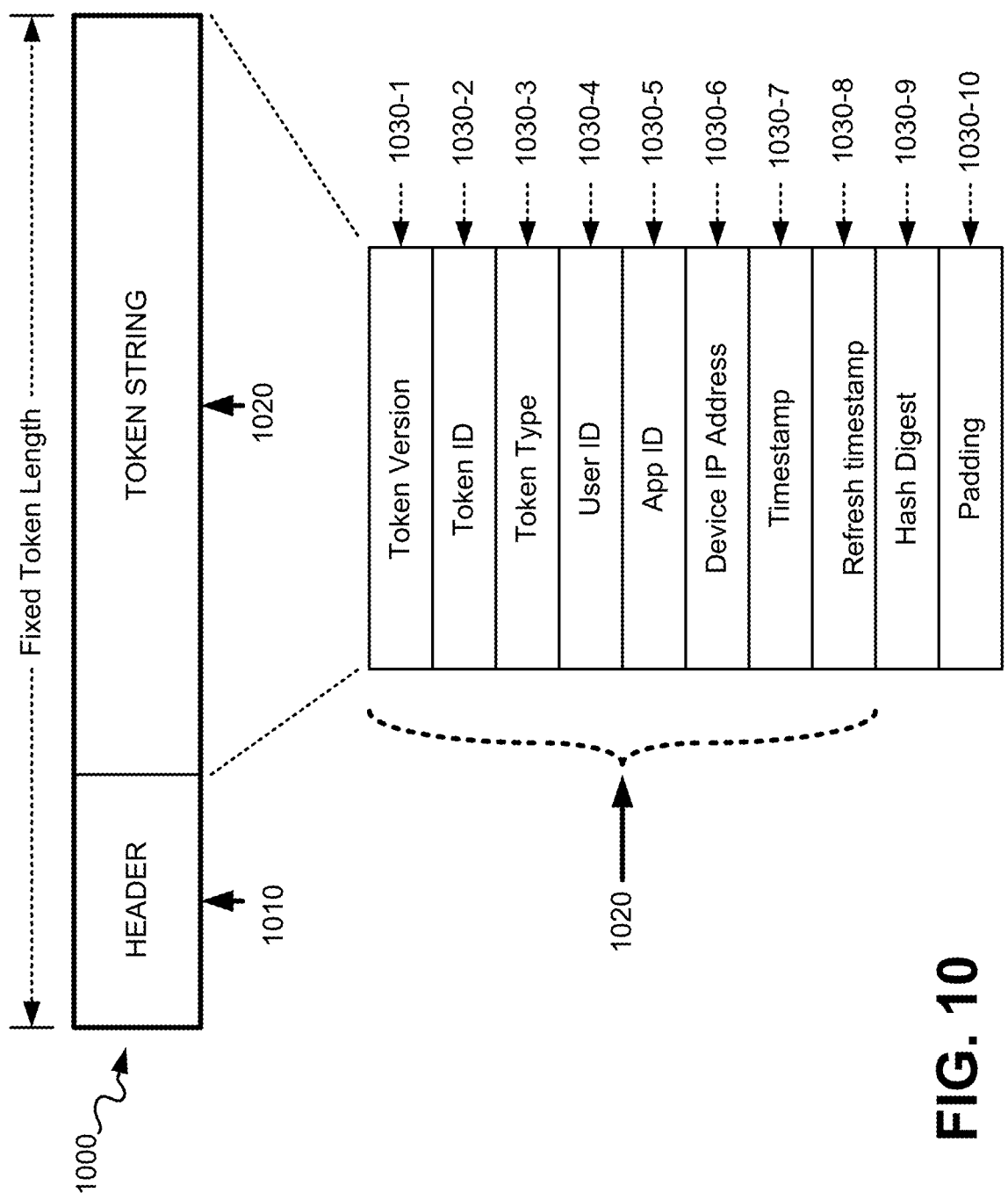
FIG. 10 is a diagram that depicts exemplary contents and structure of a token used in the processes of FIGS. 6A and 6B, 9, 11, and 13.

Authentication system 120 obtains a hash of the encrypted string array, using a hash-based message authentication code (HMAC) algorithm and a HMAC key, to produce a hash digest (block 915). The HMAC algorithm may use a same secret key, or a different secret key, as that used in block 905 to encrypt the serialized token string 1020. The HMAC algorithm takes the encrypted token string 1020 and generates, using known techniques, a hash digest. Authentication system 120 appends the hash digest to the encrypted string array to create the token string (block 920). Referring to FIG. 10, the hash digest 1030-9 is appended to the encrypted token string 1020, and additional data padding 1030-10 may also be appended to the encrypted token string 1020 to produce a fixed length token. Additionally, as shown in FIG. 10, a token header 1010 may be appended to the token 1000. The token header 1010 may include overhead token information that may be passed unencrypted in conjunction with the encrypted contents of the token 1000. Authentication system 120 encodes the token string to create the auto-authentication user token (block 925). Any type of encoding technique may be applied to encrypted token string 1020, header 1010, hash digest 1030-9, and padding 1030-10 to create the final user token. For example, in one implementation, encoding may include using Base 64 encoding to encode the data of token 1000.

Figure 11:
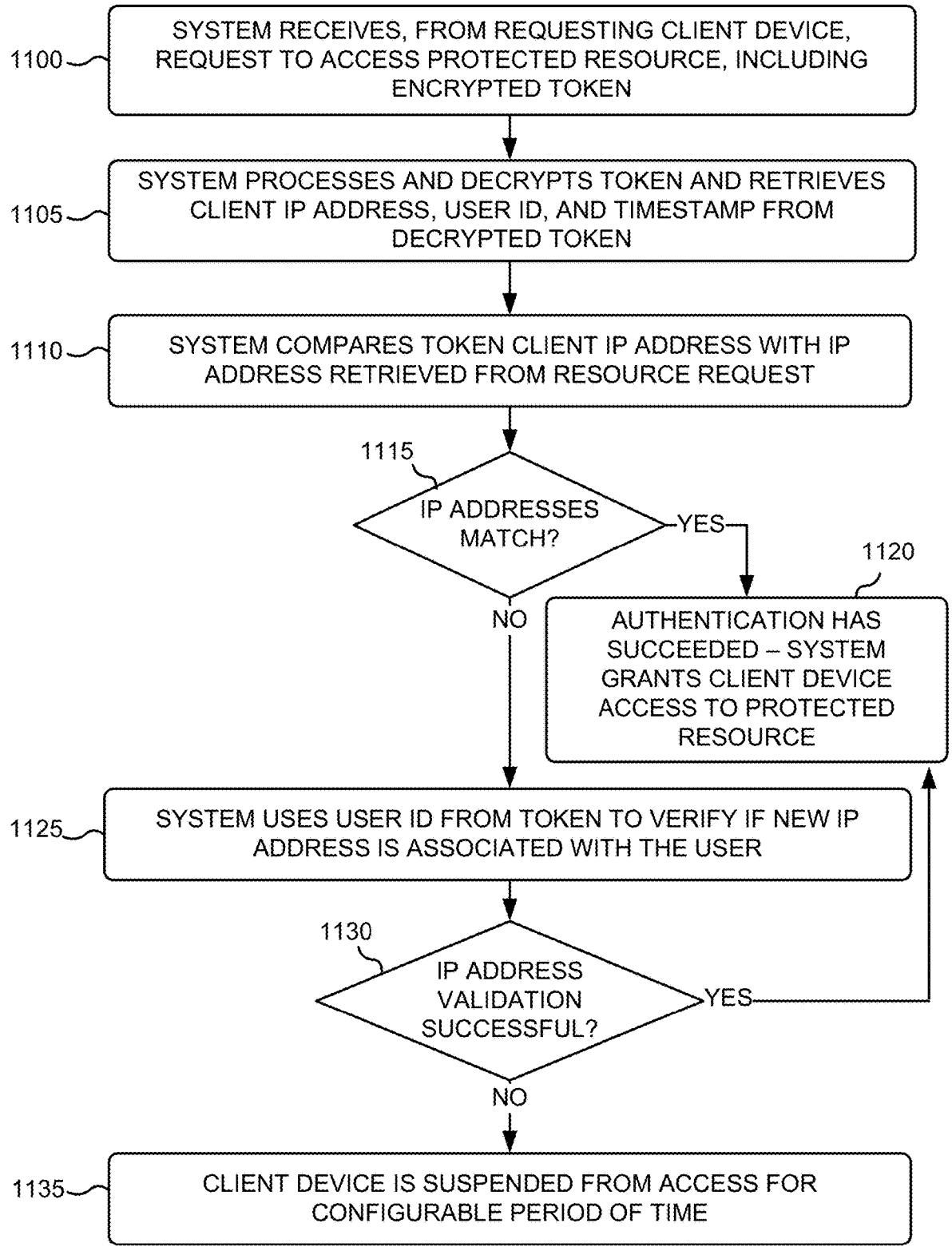
FIG. 11 is a flow diagram that illustrates an exemplary process for performing token and location-based auto-authentication for granting or denying access to a protected resource.

FIG. 11 is a flow diagram that illustrates an exemplary process for performing token and device location-based auto-authentication for granting or denying access to a protected resource. The exemplary process of FIG. 11 may be implemented by authentication system 120 (e.g., processing unit 320 of authentication system 120). The exemplary process of FIG. 11 is described below with reference to the exemplary messaging and activity diagram of FIG. 12. The exemplary process of FIG. 11 may be repeated each time a client device 100 requests access to a protected resource.

Figure 12:
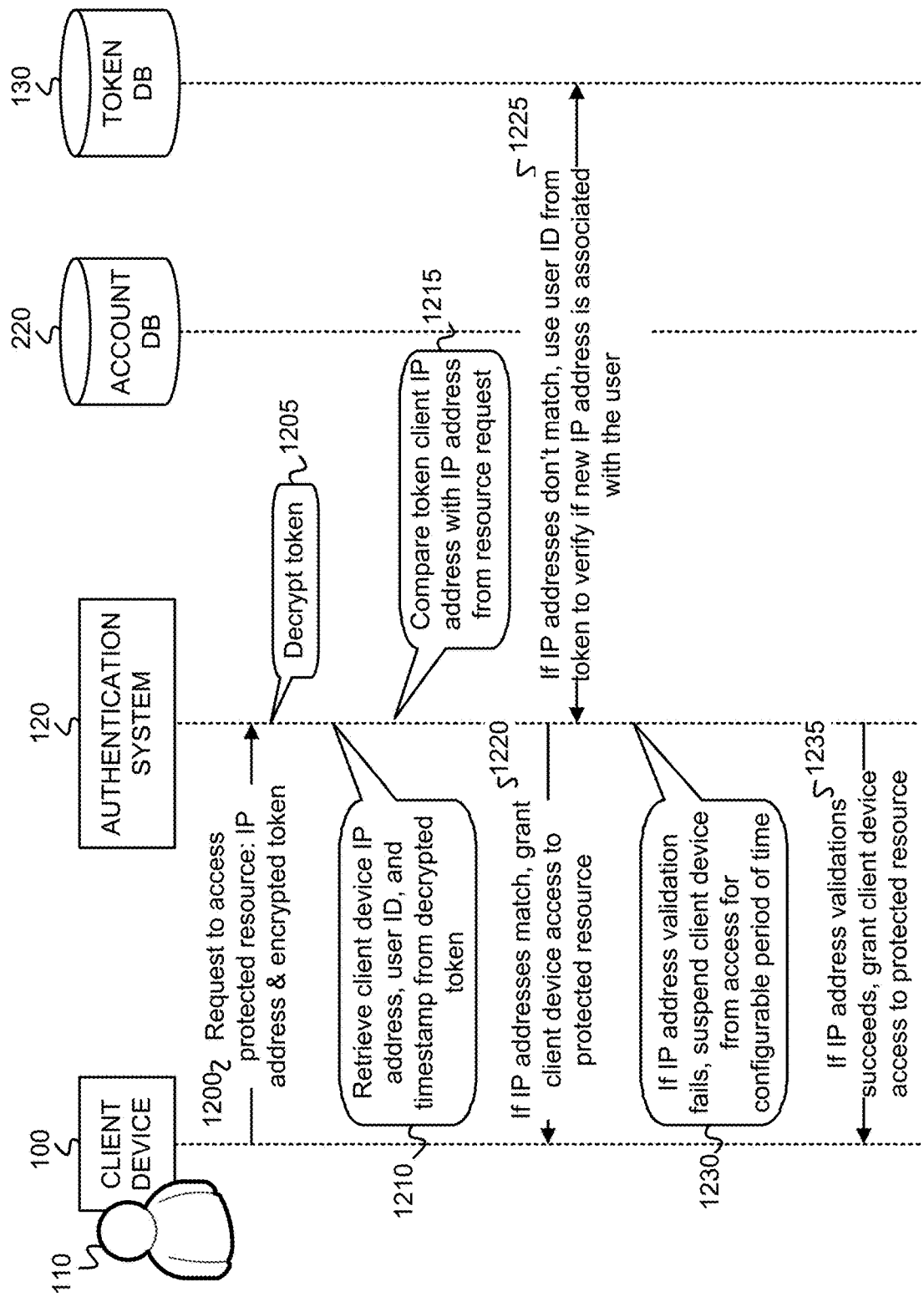
FIG. 12 is an exemplary messaging and activity diagram associated with the process of FIG. 11.

The exemplary process includes authentication system 120 receiving, from a requesting client device 100, a request to access a protected resource, where the request includes an encrypted token (block 1100). When user 110 attempts to access a protected resource, client device 100 automatically retrieves the previously stored, encrypted token from local memory and includes the encrypted token in the request to access the protected resource. The request may be sent directly from client device 100 to authentication system 120 or, alternatively, may be sent an intervening network device (e.g., a server that provides a particular protected resource) and the intervening network device passes the request to authentication system 120. FIG. 12 depicts client device 100 sending a request 1200 to access a protected resource to authentication system 120, where the request 1000 includes the IP address of client device 100 and the encrypted token retrieved from local memory at client device 100.

Authentication system 120 processes and decrypts the token, and retrieves, for example, a client IP address, user ID, and timestamp from the decrypted token (block 1105), and compares the token's client IP address with the IP address retrieved from the resource request (block 1110). Authentication system 120 uses a decryption algorithm, that is a counterpart to the encryption algorithm used in block 635 of FIG. 6B, to decrypt the token and recover the client device IP address, user ID, and timestamp. In an implementation in which a refresh timestamp was appended to the token, the refresh timestamp may additionally be recovered from the decrypted token. Authentication system 120 takes the client device IP address obtained from the decrypted token, and then compares it with the IP address of client device 100 contained in the header of the resource request sent from client device 100. As shown in FIG. 12, authentication system 120 obtains the token from the request 1200, and decrypts 1205 the token to obtain the unencrypted token. As further shown, authentication system 120 retrieves 1210 the IP address of client device 100, the user ID, and the timestamp from the decrypted token, and compares 1215 the token client IP address with the IP address included with the resource request 1000.

If the comparison indicates that the IP addresses match (YES—block 1115), then authentication has succeeded and authentication system 120 grants the client device access to the protected resource (block 1120). If a comparison, by authentication system 120, of the client device IP address obtained from the decrypted token, and the IP address of client device 100 contained in the header of the resource request sent from client device 100, indicates a match between the two, then authentication system 120 may properly conclude that client device 100, which sent the resource request, has been auto-authenticated, and authentication system 120 may grant the client device 100 access to the protected resource. FIG. 12 depicts authentication system 120 granting 1220 client device 100 access to the requested protected resource if the comparison indicated that the IP addresses match.

If the comparison indicates that the IP addresses do not match (NO—block 1115), then authentication system uses the user ID from the decrypted token to verify if a new IP address is possibly associated with the user of the client device 100 (block 1125). Authentication system 120 may obtain the user ID from the decrypted token and use it to index token DB 130 to locate an entry 500 having a user ID in field 530 that matches the user ID from the decrypted token. Upon location of the entry 500, authentication system 120 retrieves a device IP address from field 510 of the located entry 500, and compares the retrieved IP address to the IP address obtained from the resource request. If the IP addresses match, then a new IP address has been assigned to client device 100, and authentication system 120 determines that the IP address contained in the resource request has been successfully validated. If the IP address validation of block 1125 is not successful (NO—block 1130), then authentication system 120 suspends the client device 100 from access to the protected resource for a configurable period of time (block 1135). FIG. 12 depicts authentication system suspending 1230 client device 100 from protected resource access for a configurable period of time, if the IP address validation fails. If the IP address validation of block 1125 is successful (YES—block 1130), then authentication system 120 proceeds to block 1120 and sends a grant of access to the protected resource to the requesting client device 100. FIG. 12 further depicts authentication system granting 1235 access to the protected resource, if the IP address validation succeeds.

In addition to validating the IP address of the client device 100 that sent the resource request (i.e., block 1115 above), authentication system 120 may compare the timestamp retrieved from the token in block 1105 with a specified maximum "token life" parameter. If the time period extending from the retrieved timestamp to a current time exceeds the maximum "token life" parameter, then authentication may be considered to have failed and authentication system 120 may require the user 110 to manually supply user credentials (e.g., performs blocks of FIGS. 6A and 6B). Authentication system 120 may additionally disable auto-authentication for client device 100 in token DB 130. Alternatively, authentication system 120 may compare a refresh timestamp retrieved from the decrypted token and compare the refresh timestamp with a current time. If the current time exceeds the refresh timestamp, then authentication may be considered to have failed and authentication system 120 may require the user 110 to manually supply user credentials (e.g., performs blocks of FIGS. 6A and 6B). Authentication system 120 may additionally disable auto-authentication for client device 100 in token DB 130.

Figure 13:
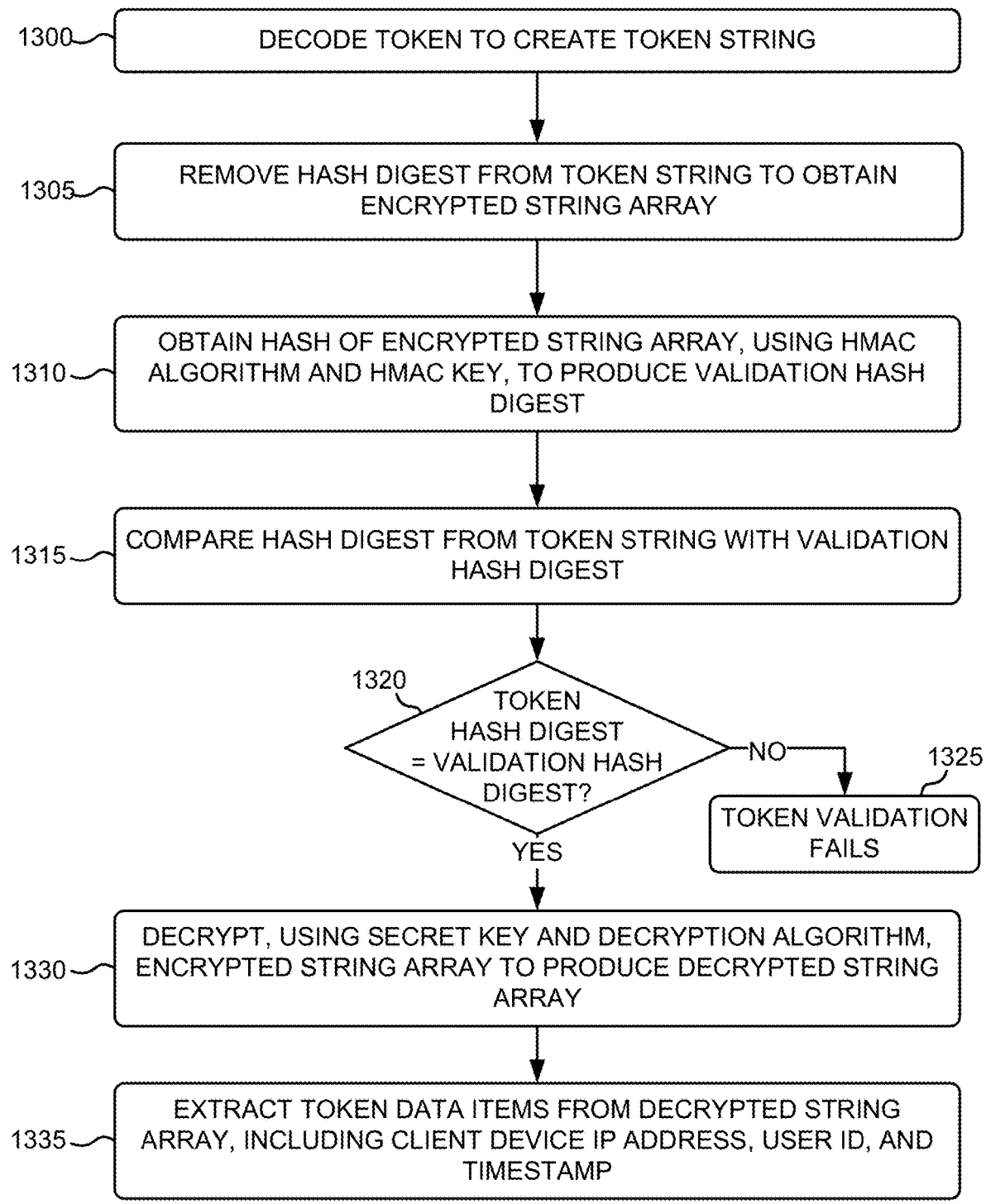
FIG. 13 is a flow diagram that describes an exemplary implementation of block 1105 of the process of FIG. 11.

FIG. 13 is a flow diagram that describes an exemplary implementation of block 1105 of the process of FIG. 11. The exemplary process of FIG. 13 may be implemented by authentication system 120 (e.g., processing unit 320 of authentication system 120). The exemplary process of FIG. 13 is described below with reference to the exemplary token content and structure diagram of FIG. 10. The exemplary process of FIG. 13 may be repeated each time block 1105 is executed within the overall process of FIG. 11.

Execution of block 1105 of FIG. 11 may include authentication system 120 decoding the user token to create a token string (block 1300). The counterpart decoding technique, to the encoding technique used in block 925 of FIG. 9, may be used to decode the token data. For example, in one implementation, decoding may include using Base 64 decoding to decode token 1000. Authentication system 120 removes the hash digest from the token string to obtain an encrypted string array (block 1305). Once token 1000 is decoded, system 120 extracts the hash digest 1030-9 from token 1000, where hash digest 1030-9 was generated in block 915 of FIG. 9.

Authentication system 120 obtains a hash of the encrypted string array, using the HMAC algorithm and HMAC key used in block 915 of FIG. 9, to produce a validation hash digest (block 1310). Similarly to block 915 of FIG. 9, the HMAC algorithm may use the same secret key, or a different secret key, as that used in block 905 of FIG. 9 to encrypt the serialized token string 1020. The HMAC algorithm takes the encrypted token string 1020 and generates, using known techniques, the validation hash digest. Authentication system 120 then compares the hash digest 1030-9 from the token 1000 with the generated validation hash digest (block 1315). If the comparison indicates that the token hash digest is not equal to (i.e., is not the same as) the validation hash digest (NO—block 1320), then the token validation fails (block 1325). Authentication system 120 may, for example, return an error message indicating that authentication has failed and that the user is denied access to the protected resource. If the comparison indicates that the token hash digest is equal to (i.e., is the same as) the validation hash digest (YES—block 1320), then authentication system 120 decrypts, using a secret key and decryption algorithm, the encrypted string array to produce a decrypted string array (block 1330). Authentication system 120 decrypts the string array of token 1000 using a counterpart decryption algorithm to the encryption algorithm used in block 910 of FIG. 9. For example, if 256-bit AES encryption was used in block 910, then 256-bit AES decryption is used to decrypt the token string.

Authentication system 120 extracts token data items from the decrypted string array, including, for example, the client device IP address, the user ID, and the timestamp (block 1335). Referring to FIG. 10, system 120 may extract all token data items from the decrypted token string, including device IP address 1030-6, user ID 1030-4, and timestamp 1030-7 and any other token data items included in the token string, such as, for example, token version 1030-1, token ID 1030-2, token type 1030-3, app ID 1030-5, and/or refresh timestamp 1030-9. Once the token data items have been extracted from the decrypted string array, authentication system 120 can continue with the auto-authentication as described above with respect to FIG. 11 (i.e., blocks 1110-1135).

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6A, 6B, 9, 11, and 13, and message/activity flows with respect to FIGS. 8 and 12, the order of the blocks and/or message/activity flows may be varied in other implementations. Moreover, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving credentials of a user of a client device;
   receiving an enrollment request from the client device, wherein the enrollment request includes an Internet Protocol (IP) address of the client device, and wherein the enrollment request includes a request to enroll the client device in a token and location-based auto-authentication service for accessing network services or network devices;
   retrieving, using the credentials of the user, one or more approved IP subnet ranges associated with the client device, wherein the one or more approved IP subnet ranges are allocated by a network service provider associated with the client device;
   comparing the IP address of the client device in the enrollment request to the one or more approved IP subnet ranges associated with the client device;
   determining to enroll the client device in the token and location-based auto-authentication service based on determining that the IP address of the client device is within an approved IP subnet range of the one or more approved IP subnet ranges associated with the client device;
   generating a token comprising the IP address and an identifier of the user based on determining to enroll the client device in the token and location-based auto-authentication service;
   generating a timestamp that indicates a time at which the token is being generated, wherein the token further comprises the generated timestamp;
   appending the timestamp, the identifier of the user, and the IP address to one another to generate the token;
   encrypting the token;
   storing, in an entry of a database, an indication that the user is enrolled in automatic authentication;
   sending the encrypted token to the client device;
   receiving, when the client device attempts to access a protected resource or a network service, a current IP address of the client device and the encrypted token from the client device for authenticating the client device without further requiring the credentials of the user, wherein the encrypted token includes the IP address of the client device included in the enrollment request received from the client device;
   authenticating the client device when the IP address from the encrypted token received from the client device matches the current IP address of the client device; and
   granting the client device access to the protected resource or the network service when the client device is authenticated.

2. The method of claim 1, wherein the token further comprises a refresh timestamp that indicates a time at which the token expires.

3. The method of claim 2, further comprising:
   appending the refresh timestamp, the identifier of the user, and the IP address to one another to generate the token.

4. The method of claim 1, further comprising:
   receiving a request to access the protected resource or the network service, wherein the request includes the current IP address of the client device and the encrypted token.

5. The method of claim 4, further comprising:
   decrypting the encrypted token to produce a decrypted token;
   extracting the IP address from the decrypted token;
   comparing the extracted IP address with the current IP address; and
   authenticating the client device based on the comparison without requiring the credentials of the user.

6. The method of claim 5, further comprising:
   extracting the identifier of the user from the decrypted token; and
   using, if the comparison indicates that the current IP address and the extracted IP address do not match, the identifier of the user to perform a database lookup to determine if the current IP address belongs to the user.

7. The method of claim 6, further comprising:
   granting, if the comparison indicates that the current IP address and the extracted IP address match, the client device access to the protected resource or network service.

8. A network device, comprising:
   a communication interface, implemented in hardware, connected to a network that:
     receives credentials of a user of a client device, and
     receives an enrollment request from the client device, wherein the enrollment request includes an Internet Protocol (IP) address of the client device, and wherein the enrollment request includes a request to enroll the client device in a token and location-based auto-authentication service for accessing network services or network devices;

a processor, implemented in hardware, that:
retrieves, using the credentials of the user, one or more approved IP subnet ranges associated with the client device, wherein the one or more approved IP subnet ranges are allocated by a network service provider associated with the client device,
compares the IP address of the client device in the enrollment request to the one or more approved IP subnet ranges associated with the client device,
determines to enroll the client device in the token and location-based auto-authentication service based on determining that the IP address of the client device is within an approved IP subnet range of the one or more approved IP subnet ranges associated with the client device,
generates a token comprising the IP address and an identifier of the user based on determining to enroll the client device in the token and location-based auto-authentication service,
generates a timestamp that indicates a time at which the token is being generated, wherein the token further comprises the generated timestamp,
appends the timestamp, the identifier of the user, and the IP address to one another to generate the token,
encrypts the token, and
stores, in an entry of a database, an indication that the user is enrolled in automatic authentication,
wherein the communication interface further:
sends the encrypted token to the client device, and
receives, when the client device attempts to access a protected resource or a network service, a current IP address of the client device and the encrypted token from the client device for authenticating the client device without further requiring the credentials of the user, wherein the encrypted token includes the IP address of the client device included in the enrollment request received from the client device, and
wherein the processor further:
authenticates the client device when the IP address from the encrypted token received from the client device matches the current IP address of the client device, and
grants the client device access to the protected resource or the network service when the client device is authenticated.

9. The network device of claim 8, wherein the token further comprises a refresh timestamp that indicates a time at which the token expires, and wherein the processor further:
appends the refresh timestamp, the identifier of the user, and the IP address to one another to generate the token.

10. The network device of claim 8, wherein the communication interface further:
receives a request to access the protected resource or the network service, wherein the request includes the current IP address of the client device and the encrypted token.

11. The network device of claim 10, wherein the processor further:
decrypts the encrypted token to produce a decrypted token;
extracts the IP address from the decrypted token;
compares the extracted IP address with the current IP; and
authenticates the client device based on the comparison without requiring the credentials of the user.

12. The network device of claim 11, wherein the processor further:
extracts the identifier of the user from the decrypted token,
uses, if the comparison indicates that the current IP address and the extracted IP address do not match, the identifier of the user to perform a database lookup to determine if the current IP address belongs to the user, and
grants, if the comparison indicates that the current IP address and the extracted IP address match, the client device access to the protected resource or network service.

13. A non-transitory storage medium storing instructions executable by a computational device, wherein the instructions comprise instructions to cause the computational device to:
receive credentials of a user of a client device;
receive an enrollment request from the client device, wherein the enrollment request includes an Internet Protocol (IP) address of the client device, and wherein the enrollment request includes a request to enroll the client device in a token and location-based auto-authentication service for accessing network services or network devices;
retrieve, using the credentials of the user, one or more approved IP subnet ranges associated with the client device;
compare the IP address of the client device in the enrollment request to the one or more approved IP subnet ranges associated with the client device, wherein the one or more approved IP subnet ranges are allocated by a network service provider associated with the client device;
determine to enroll the client device in the token and location-based auto-authentication service based on determining that the IP address of the client device matches an approved IP subnet range of the one or more approved IP subnet ranges associated with the client device;
generate a token comprising the network address and an identifier of the user based on determining to enroll the client device in the token and location-based auto-authentication service;
generate a timestamp that indicates a time at which the token is being generated, wherein the token further comprises the generated timestamp;
append the timestamp, the identifier of the user, and the IP address to one another to generate the token;
encrypt the token;
store, in an entry of a database, an indication that the user is enrolled in automatic authentication;
send the encrypted token to the client device;
receive, when the client device attempts to access a protected resource or a network service, a current IP address of the client device and the encrypted token from the client device for authenticating the client device without further requiring the credentials of the user, wherein the encrypted token includes the IP address of the client device included in the enrollment request received from the client device;
authenticate the client device when the IP address from the encrypted token received from the client device matches the current IP address of the client device; and
grant the client device access to the protected resource or the network service when the client device is authenticated.

14. The non-transitory storage medium of claim 13, wherein the token further comprises a refresh timestamp that indicates a time at which the token expires, and wherein the instructions further comprise instructions to cause the computational device to:
   append the refresh timestamp, the identifier of the user, and the IP address to one another to generate the token.

15. The non-transitory storage medium of claim 13, wherein the instructions further comprise instructions to cause the computational device to:
   receive a request to access the protected resource or the network service, wherein the request includes the current IP address of the client device and the encrypted token;
   decrypt the encrypted token to produce a decrypted token;
   extract the IP address from the decrypted token;
   compare the extracted network address with the current IP address; and
   authenticate the client device based on the comparison without requiring the credentials of the user.

16. The non-transitory storage medium of claim 15, wherein the instructions further comprise instructions to cause the computational device to:
   extract the identifier of the user from the decrypted token,
   use, if the comparison indicates that the current IP address and the extracted IP address do not match, the identifier of the user to perform a database lookup to determine if the current IP address belongs to the user, and
   grant, if the comparison indicates that the current IP address and the extracted network match, the client device access to the protected resource or network service.

* * * * *